United States Patent [19]

de Montmollin et al.

[11] 3,923,778
[45] Dec. 2, 1975

[54] DISAZO DYESTUFFS CONTAINING THE α:β-DICHLORO- OR α:β-DIBROMOPROPIONYLAMINO GROUP

[75] Inventors: Rene de Montmollin, Riehen; Henri Riat, Arlesheim, both of Switzerland

[73] Assignee: Ciba-Geigy AG, Basle, Switzerland

[22] Filed: June 1, 1972

[21] Appl. No.: 258,773

Related U.S. Application Data

[60] Division of Ser. No. 876,069, Nov. 12, 1969, Pat. No. 3,755,290, which is a continuation-in-part of Ser. No. 753,829, July 22, 1968, abandoned, which is a continuation of Ser. No. 608,710, Nov. 1, 1966, abandoned, which is a division of Ser. No. 305,539, Aug. 29, 1963, abandoned, which is a continuation-in-part of Ser. No. 731,097, April 28, 1958, abandoned.

[52] U.S. Cl. .............. 260/174; 260/178; 260/181; 260/184; 260/185; 260/187; 260/191
[51] Int. Cl.² C09B 62/00; C09B 62/04; D06P 3/66
[58] Field of Search .......... 260/181, 185, 189, 191, 260/174, 178, 184, 187

[56] References Cited
UNITED STATES PATENTS

| | | | |
|---|---|---|---|
| 2,436,436 | 2/1948 | Knight et al. | 260/185 |
| 3,040,024 | 6/1962 | Riat et al. | 260/196 |
| 3,122,532 | 2/1964 | Hurbin et al. | 260/199 |
| 3,123,595 | 3/1964 | Brugger et al. | 260/151 |
| 3,126,368 | 3/1964 | Bossard et al. | 260/151 |
| 3,222,354 | 12/1965 | Lange | 260/163 |
| 3,498,967 | 3/1970 | De Montmollin et al. | 260/181 |

FOREIGN PATENTS OR APPLICATIONS
885,815  12/1961  United Kingdom ................ 260/199

*Primary Examiner*—Floyd D. Higel
*Attorney, Agent, or Firm*—Wenderoth, Lind & Ponack

[57]  ABSTRACT

Fibre-reactive disazo dyestuffs containing at least two and at most four sulphonic acid groups and at least one and at most two aromatically bound α:β-dichloro- or α:β-dibromopropionylamino groups correspond to the formula

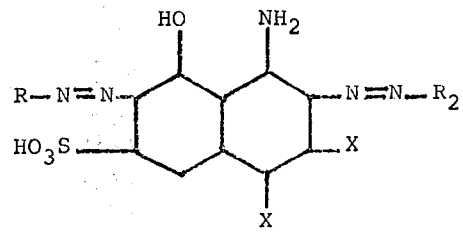

wherein R is an o-sulfobenzene radical which may be further substituted by lower alkyl, lower alkoxy, trifluoromethyl, chlorine or bromine, one X is hydrogen and the other X is a sulfonic acid group and $R_2$ is a benzene radical which may be substituted by lower alkyl, lower alkoxy, trifluoromethyl, chlorine, bromine, sulfo or nitro. These dyestuffs yield brilliant dyeings of excellent general fastness-properties on cotton.

5 Claims, No Drawings

DISAZO DYESTUFFS CONTAINING THE α:β-DICHLORO- OR α:β-DIBROMOPROPIONYLAMINO GROUP

CROSS-REFERENCES TO RELATED APPLICATIONS

This is a division of application Ser. No. 876,069, filed Nov. 12, 1969, and now U.S. Pat. No. 3,755,290, which application is a continuation-in-part application of our copending application Ser. No. 753,829, filed July 22, 1968, now abandoned which was a streamlined continuation of our application Ser. No. 608,710, filed Nov. 1, 1966, now abandoned, which itself was a division of our application Ser. No. 305,539, filed Aug. 29, 1963, now abandoned, which in turn was a continuation-in-part of our application Ser. No. 731,097, filed Apr. 28, 1958, now abandoned.

This invention provides valuable new water-soluble azo dyestuffs which contain at least one aromatically bound α,β-dichloro- or dibromopropionylamino group. More especially it provides o-sulfobenzene-o'-hydroxy or -o'-aminomonoazo naphthalene dyestuffs containing at least two and at most three sulfonic acid groups and at least one and at most two aromatically bound α:β-dichloro- or dibromopropionylamino groups, which dyestuffs may be further substituted in the benzene radical by lower alkyl, lower alkoxy, phenoxy, acetylamino, chlorine or bromine. Furthermore, it also provides benzenemonoazosulfonaphthalene dyestuffs containing at least two and at most three sulfonic acid groups and at least one and at most two aromatically bound α:β-dichloro or dibromo propionylamino groups, which dyestuffs may be further substituted in the benzene radical by amino, lower alkyl or lower alkoxy. The invention also provides o-sulfobenzene or sulfonaphthalenemonoazo pyrazolone dyestuffs containing at least two and at most three sulfonic acid groups and at least one and at most two aromatically bound α:β-dichloro- or -dibromopropionylamino groups, which dyestuffs may be further substituted in the diazo component by lower alkyl, lower alkoxy, phenoxy, acylamino other than α,β-dihalogenpropionylamino, chlorine or bromine and in which dyestuffs the coupling component is a 3-methyl- or 3-carboxy-5-pyrazolone bound to the azo-linkage in 4-position.

Included in the invention are moreover complex chromium, cobalt or copper compounds of monoazo dyestuffs containing at least two and at most three sulfonic acid groups and at least one and at most two aromatically bound α:β-dichloro- or -dibromopropionylamino groups, which dyestuffs correspond to the formula

R—N=N—R$_1$ wherein R is the radical of an o-hydroxybenzene or an o-hydroxynaphthalene which may be further substituted by lower alkyl, lower alkoxy, acylamino other than α,β-dihalogenopropionylamino, chlorine or bromine and R$_1$ is the radical of a hydroxy- or aminonaphthalene bound to the azolinkage in o-position to a hydroxy or amino group or the radical of a 3-methyl- or 3-carboxy-5-pyrazolone bound to the azo-linkage in 4-position. Further complexes falling within this invention are chromium, cobalt or copper complexes of monoazodyestuffs containing at least two and at most three sulfonic acid groups and corresponding to the formula

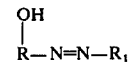

wherein R represents a phenyl- or sulfophenyl-radical bound to the azobridge in o-position to the hydroxyl group and R$_1$ represents the radical of an aminonaphthol sulfonic acid bound to the azo linkage in vicinal position to the hydroxyl group and bearing a α:β-dichloro or dibromopropionyl group on the amino group.

Finally, the instant invention also relates to disazo-dyestuffs containing at least two and at most four sulfonic acid groups and at least one and at most two aromatically bound α:β-dichloro- or dibromopropionylamino groups, which dyestuffs correspond to the formula

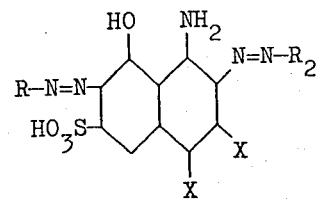

wherein R is an o-sulfobenzene radical which may be further substituted by lower alkyl, lower alkoxy, trifluoromethyl, chlorine or bromine, one X is hydrogen and the other X is a sulfonic acid group and R$_2$ is a benzene radical which may be substituted by lower alkyl, trifluoromethyl, chlorine or bromine, sulfo or nitro. In the above definition the term "lower" means: "containing up to 4 carbon atoms".

Especially valuable groups of such dyestuffs are e.g.:

1. Dyestuffs of the general formula

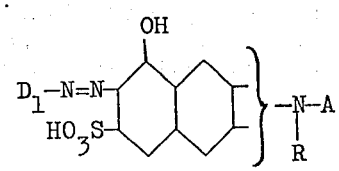

wherein A stands for α,β-dichloro- or dibromopropionyl, R for hydrogen or an optionally substituted lower alkyl radical, and D$_1$ for the radical of a diazo component which contains at least one sulfonic acid group and which also may contain an α:β-dichloro- or dibromopropionylamino group.

Valuable are e.g., diazo components in which the radical D$_1$ has the formula

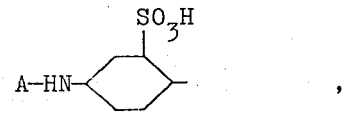 , 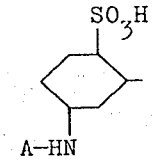

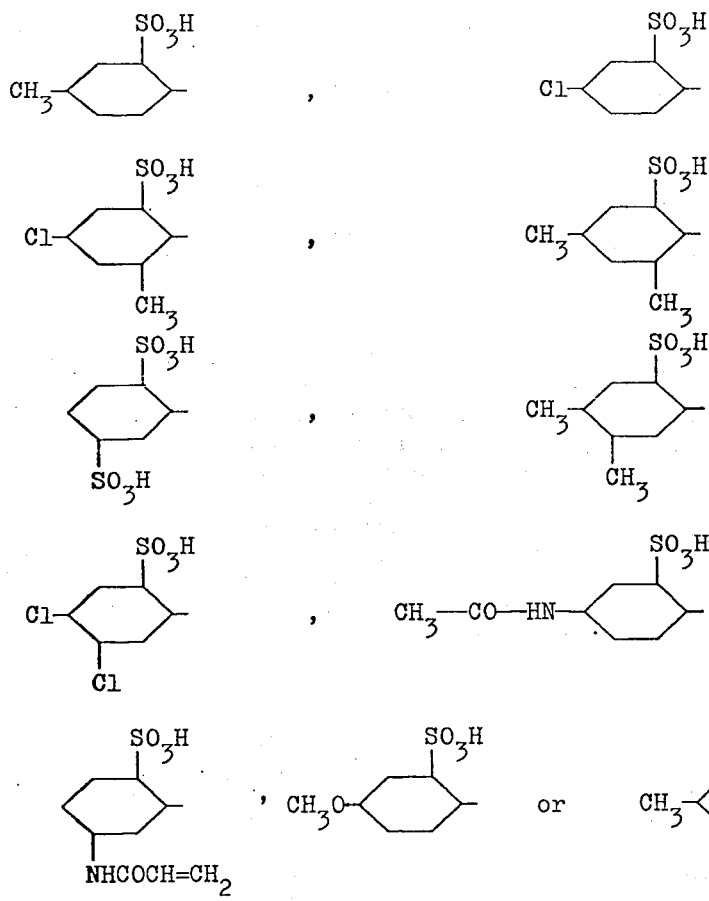

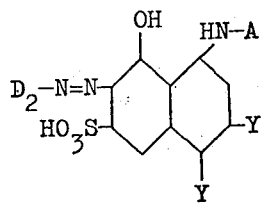, 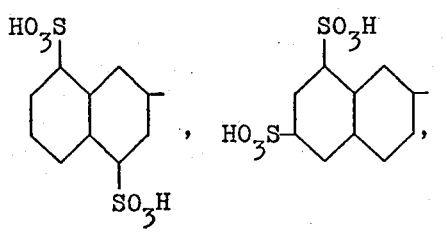

2. Dyestuffs of the general formula

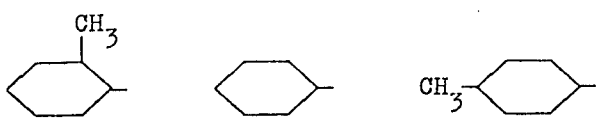

wherein A has the aforecited meaning, one Y stands for hydrogen and the other for a sulfonic acid group, and $D_2$ stands for the radical of a diazo component which may contain one water-solubilizing group, e.g.

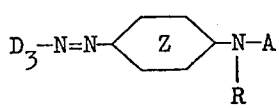

or especially diazo components mentioned above, which contain an α:β-dichloro- or dibromopropionylamino group and/or a sulfo group.

3. Dyestuffs of the general formula

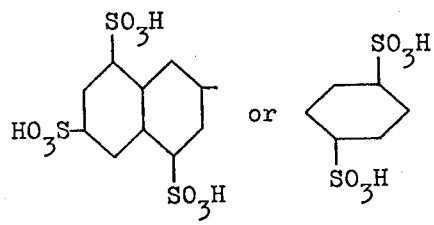

wherein A and R possess the aforecited meanings, $D_3$ stands for the radical of a diazo component which contains at least two sulfonic acid groups and may contain further substituents such as azo groups, especially the radicals and wherein the benzene nucleus Z may contain further substituents, as e.g.

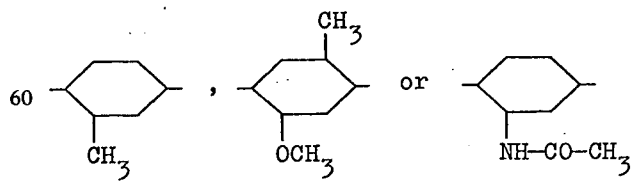

4. Monoazo dyestuffs with at least two sulfonic acid groups of the general formula
    A—NH-$D_4$—N=N—$K_1$
wherein A possesses the aforecited meaning, $D_4$ stands for the radical of a diazo component, e.g.,

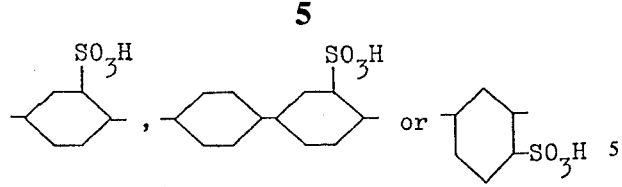

whereby the sulfonic acid group is in ortho-position to the azo group, and $K_1$ stands for the radical of a hydroxynaphthalenesulfonic acid which may be further substituted, e.g.

5. Dyestuffs of general formula

wherein A and R possess the aforecited meanings, $D_5$ stands for the radical of a diazo component which contains at least one sulfonic acid group and may contain an azo group, e.g.

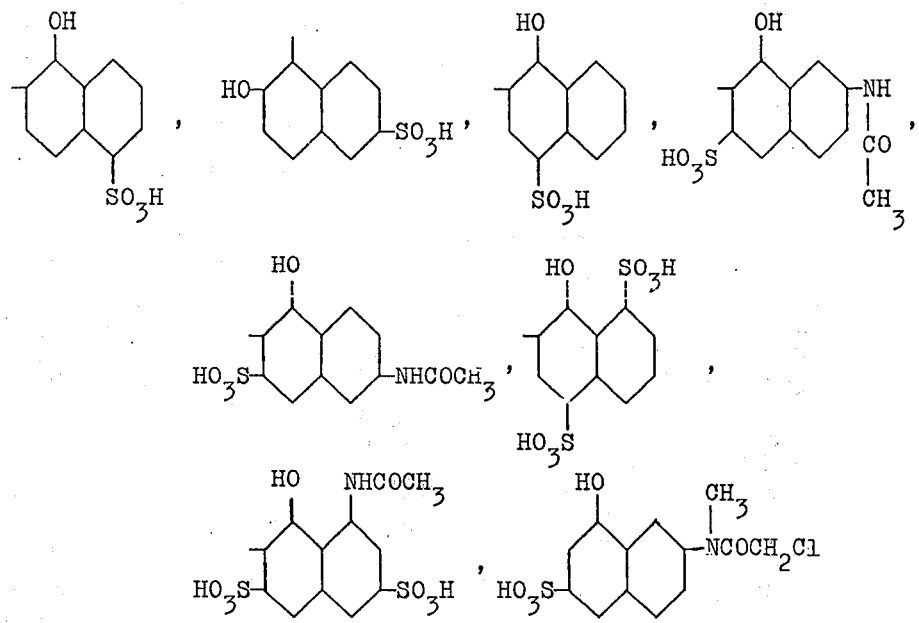

or a ketomethylene compound, e.g.

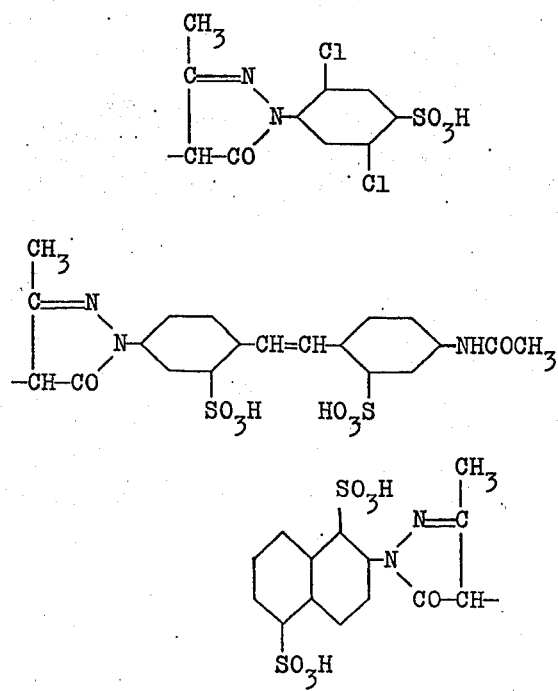

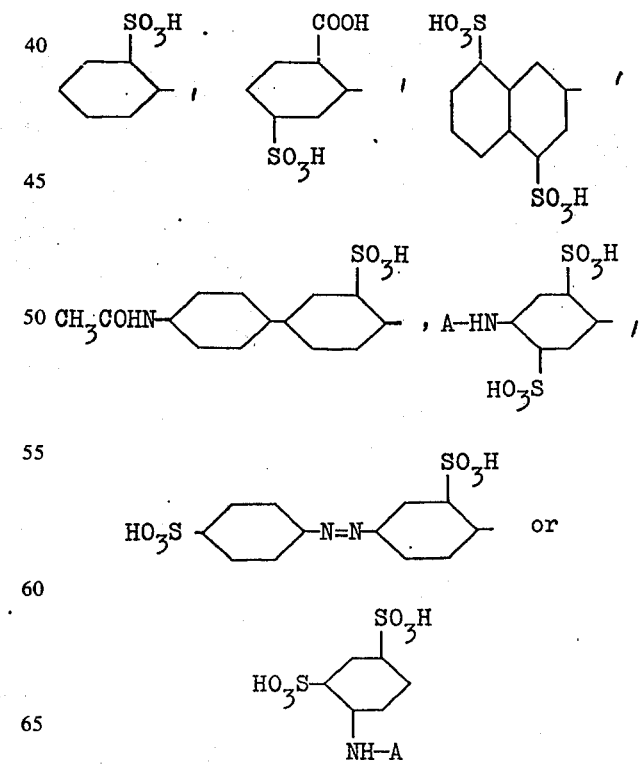

and $K_2$ for the radical of a coupling compound which couples in the adjacent position to an enolizable keto group, e.g.

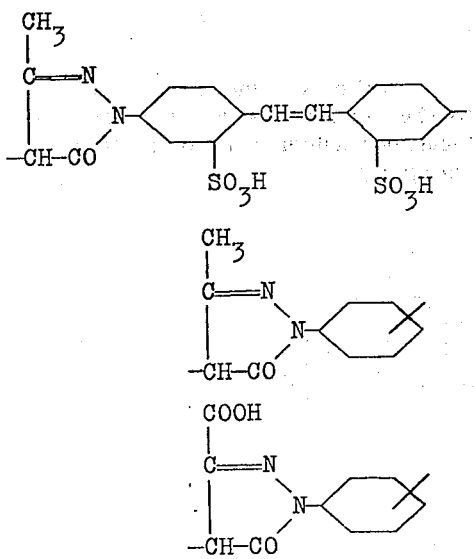

and the dyestuff itself contains at least two sulfonic acid groups.

6. Metal complex compounds of monoazo dyestuffs having at least two acid-solubilizing groups and at least one $\alpha,\beta$-dichloro- or dibromopropionylamino group.

Suitable metal atoms are chromium, cobalt, nickel, and copper atoms, the last-named being preferred.

The choice of diazo components for building dyestuffs of this type includes 2-amino-1-hydroxybenzenes, 1-amino-2-hydroxy- and 2-amino-1-hydroxynaphthalenes, and 2-aminobenzene-1-carboxylic acids. Examples of suitable coupling compounds are 1-(amino)aryl-5-pyrazolones and aminohydroxynaphthalenesulfonic acids.

The $\alpha,\beta$-dichloro- or dibromo propionyl radical may be attached to the coupling compound, for instance in the following combination:

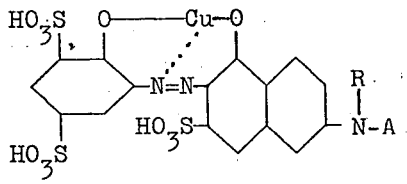

wherein R and A have the aforecited meanings, or alternatively to the diazo component, e.g.:

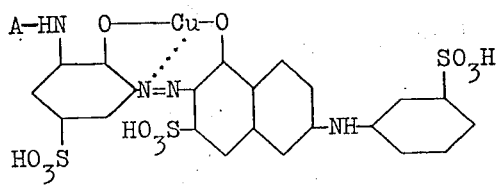

In addition the $\alpha,\beta$-dichloro- or dibromopropionyl radical may be attached to both the diazo-component and the coupling-component, e.g., in the following combination

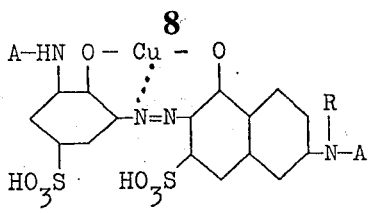

wherein A and R possess the aforecited meanings.

Naturally 2:1 metal complexes as well as 1:1 complexes can be produced. The former contain preferably chromium or cobalt metal atoms.

The dyestuffs of this invention may be obtained from dyestuff components which already contain the dihalogenated propionyl radical. Such dyestuff components are obtainable by methods in themselves known, for example, by the acylation of appropriate compounds with a halide or anhydride of an $\alpha:\beta$-dihalogen-propionic acid.

Suitable compounds for this purpose are those which contain an easily acylatable amino group, for example, a monoalkylamino group or a primary amino group, and in the case of diazo-components, a less easily acylatably primary amino group, and in the case of coupling components either a less easily acylatable amino group or a hydroxyl group responsible for coupling. As amino groups that are less readily acylated there may be mentioned principally those which occupy a position vicinal to an acid group, for example, a sulfonic acid group. Aminohydroxy-compounds are acylated in such manner that esterification of the hydroxyl group is avoided.

Instead of introducing the aforesaid radicals into the dyestuff components before the dyestuff is made, they may be introduced into the finished dyestuffs. Thus, valuable dyestuffs containing an $\alpha:\beta$-dichloro- or dibromopropionylamino group can be obtained by reacting a dyestuff which contains an acylatable amino group, and above all a free amino group, with, for example, $\alpha:\beta$-dichloro- or dibromopropionic acid chloride or anhydride.

As soluble organic dyestuffs, which can be made in the above manner, there may be used metal-free or metalliferous monoazo- and disazo-dyestuffs which latter may also be prepared by metallisation. Especially good results are obtained with soluble azodyestuffs which possess no affinity for cotton or at most no pronounced affinity therefor. Such amino-azo-dyestuffs may be obtained e.g., by hydrolysis of acylamino-azo-dyestuffs, by reduction of the nitro groups of nitro-azo-dyestuffs or by coupling a diazotized aromatic amine with a coupling component containing an acylatable amino group.

As amines which, after diazotation, may be used as diazo components to produce mono- and disazo dyestuffs for use of the process of this invention, there may be mentioned for example:
aminobenzene, 1-amino-2(3 or 4)-methylbenzene,
1-amino-4-methoxybenzene-2-sulfonic acid,
1-aminobenzene-2(3 or 4)-sulfonic acid,
1-aminobenzene-2,5(or 2,4)-disulfonic acid, 3 (or 4)-nitro-1-aminobenzene, 4-nitro-1-aminobenzene-2-sulfonic acid,
4 (or 5)acetylamino-1-aminobenzene-2-sulfonic acid,
4- (or 3) acetylamino-1-aminobenzene,
4 (or 5)-nitro-2-hydroxy-1-aminobenzene,
6-acetylamino-2-hydroxy-1-aminobenzene-5-sulfonic acid,
2-hydroxy-1-aminobenzene-4 (or 5)-sulfonic acid,
2 (3 or 4)-aminobenzoic acid,
4-chloroacetylamino-1-aminobenzene-2-sulfonic acid, 4-β-Chlorpropionylamino-1-aminobenzene-2-sulfonic acid,
3-trifluoromethyl-1-aminobenzene-6-sulfonic acid, 3-trifluoromethyl-6-phenoxy-1-aminobenzene, 4-methoxy-1-aminobenzene-2-sulfonic acid,
1-aminoazobenzene-2,4'-disulfonic acid,
4,4'-diaminodiphenyl-2,2' (or 3,3')-disulfonic acid,
1-amino-4-methyl (chloro-, bromo- or phenoxy)-benzene-6-sulfonic acid,
1-aminonaphthalene-3,6-disulfonic acid,
2-aminonaphthalene-6,8-disulfonic acid,
2-aminonaphthalene-1-sulfonic acid,
4,4'-diamino-5,5'-dimethyldiphenyl-2,2'-disulfonic acid,
2-amino-4 (or 5)-acetylamino-4'-methyl-1:1'-diphenylsulfone,
1-aminonaphthalene-4 (5, 6 or 7)-sulfonic acid,
2-aminonaphthalene-4,8-disulfonic acid,
2-aminonaphthalene-5,7-disulfonic acid,
2-aminonaphthalene-4,6,8-trisulfonic acid,
2-aminonaphthalene-1 (4, 6, 7 or 8)-sulfonic acid.

Of special value are diazotisable amines containing an α,β-dichloro- or dibromopropionylamino group, e.g.,
1-amino-3 (or 4)-dichloro (or dibromo)-propionylaminobenzene-6-sulfonic acid,
1-amino-3-dichloro (or dibromo)-propionylamino-4-chloro (methyl or methoxy)-6-sulfonic acid,
1-amino-4-dichloro (or dibromo)-propionylaminobenzene-2,5 (or 2,6)-disulfonic acid and
1-amino-3-dichloro (or dibromo)-propionylaminobenzene-4,6-di-sulfonic acid.

As coupling components which may be used to produce mono- or disazodyestuffs for use of the process of this invention, there may be mentioned:
aminobenzene,
3-acetylamino-1-aminobenzene,
3-methoxy-1-aminobenzene,
3-dichloropropionylamino-1-aminobenzene,
5-methoxy-2-methyl-1-aminobenzene,
1-amino-2-methoxybenzene,
N-ethyl-N-benzylphenylamino-sulfonic acid,
1,3-diaminobenzene-6-sulfonic acid,
meta-toluidine, 3-aminophenyl urea,
3-methyl-5-pyrazolone,
1-(2'-methyl-6'-chlorophenyl)-3-methyl-5-pyrazolone,
3-carboxy-5-pyrazolone,
1-phenyl-3-methyl-5-pyrazolone,
1-[2'-(or 3' or 4')-chlorophenyl]-3-methyl-5-pyrazolone,
1-[3' (or-4')-aminophenyl]-3-carboxy-5-pyrazolone,
1-[2'-(or 3'- or 4')-sulfophenyl]-3-methyl-5-pyrazolone,
1-(2'-chloro-5'-sulfophenyl)-3-methyl-5-pyrazolone,
1-(2',5'-dichloro-4'-sulfophenyl)-3-methyl-5-pyrazolone,
barbituric acid,
acetoacetic acid ortho-anisidide,
1-aminonaphthalene-4 (5, 6, 7 or 8)-sulfonic acid,
1- or 2-hydroxynaphthalene,
1-hydroxynaphthalene-4 (or 5)-sulfonic acid,
2-hydroxynaphthalene-4(6, 7 or 8)-sulfonic acid,
2-hydroxynaphthalene-3,6 (5,7 or 6,8)-disulfonic acid,
2-aminonaphthalene-5 (6, 7 or 8)-sulfonic acid,
1-amino-8-hydroxynaphthalene-4,6-disulfonic acid,
1-hydroxynaphthalene-3,6 (or 4,8)-disulfonic acid,
2-N-methylaminonaphthalene-6 (7 or 8)-sulfonic acid,
2-amino-8-hydroxynaphthalene-6-sulfonic acid,
2-N-methylamino-8-hydroxynaphthalene-6-sulfonic acid
1-amino-8-hydroxynaphthalene-3,6-disulfonic acid,
2-amino-5-hydroxynaphthalene-7-sulfonic acid,
2-N-methylamino-5-hydroxynaphthalene-7-sulfonic acid,
2-phenylamino-8-hydroxynaphthalene-3',6-disulfonic acid,
2-N-(3'-carboxyphenyl)amino-5-hydroxynaphthalene-7-sulfonic acid,
1-benzoylamino-8-hydroxynaphthalene-3,6 (or 4,6)-disulfonic acid,
2-ureido-5-hydroxynaphthalene-7-sulfonic acid,
2-carbethoxyamino-5-hydroxynaphthalene-7-sulfonic acid,
2-β-methoxycarbethoxyamino-5-hydroxynaphthalene-7-sulfonic acid,
1-(n-butyrylamino)-8-hydroxynaphthalene-3,6(or 4,6)-disulfonic acid
1-acryloylamino-8-hydroxynaphthalene-3,6 (or 4,6)-disulfonic acid
1-β-chloropropionylamino-8-hydroxynaphthalene-3,6(or 4,6)-disulfonic acid
1-chloroacetylamino-8-hydroxynaphthalene-3,6(or 4,6)-disulfonic acid.

As examples of dyestuffs containing acylatable amino groups for use in the process of this invention, to be acylated, for example, with a dichloro or dibromopropionic acid halide or a corresponding acid anhydride, there may be mentioned the following (the acylatable amino group is underlined; the shade obtained with the acylated dyestuff is indicated in parenthesis):
1-amino-7-(4'-methyl)-phenylazo-8-hydroxynaphthalene-4,6-disulfonic acid (blue-red),
1-hydroxy-2-(3'-amino)-phenylazo-naphthalene,3,6-,6'-trisulfonic acid (scarlet),
1-amino-7-(2'-methyl)-phenylazo-8-hydroxynaphthalene-3,6,5'-trisulfonic acid (blue-red),
1-amino-7-(2'-methyl)-phenylazo-8-hydroxynaphthalene-3,6,4'-trisulfonic acid (blue-red),
1-amino-7-(4'-methoxy)-phenylazo-8-hydroxynaphthalene-3,6,6'-trisulfonic acid (blue-red),
1-amino-7-(3'-acetylamino)-phenylazo-8-hydroxynaphthalene-3,6,6'-trisulfonic acid (blue-red),
1-amino-7-(3'-amino)-phenylazo-8-hydroxynaphthalene-3,6,6'-trisulfonic acid (blue-red),
1-amino-7-(3'-amino-4'-methyl)-phenylazo-8-hydroxy-naphthalene-3,6,6'-trisulfonic acid (violet),
1-amino-7-(3'-trifluoromethyl)-phenylazo-8-hydroxy-naphthalene-3,6,6'-trisulfonic acid (blue-red),
1-amino-7-[4'-(6''-methyl)-benzothiazolyl-(2'')]-phenylazo-8-hydroxy-naphthalene-3,6,X''-trisulfonic acid (blue-violet),
2-(4'amino)-phenylazo-naphthalene-4,8-disulfonic acid (orange-yellow),
2-(4'-amino-2'-acetylamino)-phenylazo-naphthalene-4,8-disulfonic acid (orange),
2-(4'-amino-2'-sulfoacetylamino)-phenylazo-naphthalene-4,8-disulfonic acid (orange),
2-(4'-amino-2'-methyl)-phenylazo-naphthalene-5,7-disulfonic acid (orange),
2-(4'-amino-3'-carboxy)-phenylazo-naphthalene-4,8-disulfonic acid (orange),
1-phenyl-3-methyl-4-(3''-amino)-phenylazo-5-pyrazolone-2',6''-disulfonic acid (yellow),
1-[(4''-acetylamino)-stilbenyl-(4')]-3-methyl-4-3'''-amino)-phenylazo-5-pyrazolone-2',2'',6'''-trisulfonic acid (orange-yellow),
1-(2',5'-dichloro)-phenyl-3-methyl-4-[(4'''-amino)-phenyl]-phenylazo-5-pyrazolone-4',2'''-disulfonic acid (orange), 1-phenyl-3-methyl-4-(6''-amino-naphthyl-2''-azo)-5-pyrazolone-3',4'',8''-trisulfonic acid (orange),
1-naphthyl-(2')-3-methyl-4-(4''-amino)-phenylazo-5-pyrazolone-5',7',2''-trisulfonic acid (orange),
1-(2',5'-dichloro)-phenyl-3-methyl-4-(4''-amino)-phenylazo-5-pyrazolone-4',2''-disulfonic acid (golden-orange),
1-(4'-aminophenyl)-3-methyl-4-phenylazo-5-pyrazolone-2'',4''-disulfonic acid (orange-yellow),
1-(2',5'-dichloro)-phenyl-3-methyl-4-[4''-(4'''-amino-2'''-methyl)-phenyl-3''-methyl]-phenylazo-5-pyrazolone-4',6''-disulfonic acid (orange-yellow),
1-naphthyl-(2')-3-methyl-4-(3'-amino)-phenylazo-5-pyrazolone-4',8',6''-trisulfonic acid (orange-yellow),
1-phenyl-3-methyl-4-(4''-amino)-phenylazo-5-pyrazolone-2',5',2''-trisulfonic acid (orange),
1-(3'-amino)-phenylazo-2-hydroxy-naphthalene-6,6'-disulfonic acid (orange-red),
1-(3'-amino)-phenylazo-2-hydroxy-naphthalene-8,6'-disulfonic acid (orange-red),
1-(3'-amino)-phenylazo-2-hydroxy-naphthalene-6,8,6'-trisulfonic acid (orange-red),
1-(3'-amino)-phenylazo-2-hydroxy-naphthalene-3,6,6'-trisulfonic acid (orange-red),
1-hydroxy-2-(3'-amino)-phenylazo-naphthalene-3,6'-disulfonic acid (orange-red),
1-hydroxy-2-(3'-amino)-phenylazo-naphthalene-4,6'-disulfonic acid (scarlet),
1-hydroxy-2-(3'-amino)-phenylazo-naphthalene-5,7,6'-trisulfonic acid (red),
1-hydroxy-2-(3'-amino)-phenylazo-naphthalene-3,8,6'-trisulfonic acid (blue-red),
1-hydroxy-2-(3'-amino)-phenylazo-8-chloronaphthalene-3,6,6'-trisulfonic acid (red),
1-hydroxy-2-(3'-amino)-phenylazo-8-acetylamino-naphthalene-3,6,6'-trisulfonic acid (blue-red),
1-hydroxy-2-(3'-amino)-phenylazo-8-(4''-chloro)-benzoylamino-naphthalene-3,6,6'-trisulfonic acid (blue-red),
1-hydroxy-2-(3'-amino)-phenylazo-6-propionylamino-naphthalene-3,6'-disulfonic acid (orange-red),
1-hydroxy-2-(3'-amino)-phenylazo-7-propionylamino-naphthalene-3,6'-disulfonic acid (red),
1-hydroxy-2-(3'-amino)-phenylazo-7-amino-naphthalene-3,6'-disulfonic acid (red),
1-hydroxy-2-(3'-amino-4'-methyl)-phenylazo-naphthalene-4,6'-disulfonic acid (red),
1-hydroxy-2-(3'-amino-4'-methyl)-phenylazo-naphthalene-3,6,6'-trisulfonic acid (blue-red),
1-(4'-amino)-phenylazo-2-hydroxy-naphthalene-8,2'-disulfonic acid (blue-red),
1-(4'-amino)-phenylazo-2-hydroxy-naphthalene-6,8,2'-trisulfonic acid (blue-red),
1-hydroxy-2-(4'-amino)-phenylazo-naphthalene-3,2'-disulfonic acid (blue-red),
1-hydroxy-2-(4'-amino)-phenylazo-8-acetylamino-naphthalene-3,5,2'-trisulfonic acid (violet),
1-hydroxy-2-(4'-amino)-phenylazo-8-(3''-chloro)-benzoyl-amino-naphthalene-3,5,2'-trisulfonic acid (violet),
1-[4'-(4''-amino)-phenyl]-phenylazo-2-hydroxy-naphthalene-6,8,2'-trisulfonic acid (blue-red),
1-hydroxy-2-[4'-(4''-amino)-phenyl]-phenylazo-naphthalene-3,6,2'-trisulfonic acid (blue-red),
1-hydroxy-2-[4'-(4''-amino)-phenyl]-phenylazo-8-chloronaphthalene-3,6,2'-trisulfonic acid (blue-red),
1-hydroxy-2-[4'(4''-amino-2''-methyl)-phenyl-3'-methyl]-phenylazo-naphthalene-4,6'-disulfonic acid (red),
1-hydroxy-2-[4'-(4''-amino-2''-methyl)-phenyl-3'-methyl]-phenylazo-naphthalene-3,6,6'-trisulfonic acid (blue-red),
1-hydroxy-2-[4'-(4''-amino-2''-methyl)-phenyl-3'-methyl]-phenylazo-naphthalene-3,8,6'-trisulfonic acid (blue-red),
1-[4'-(4''-amino-2''-methyl)-phenyl-3'-methyl]-phenylazo-2-amino-8-hydroxy-naphthalene-6,6'-disulfonic acid (blue-red),
1-[4'-(4''-amino-2''-methyl)-phenyl-3'-methyl]-phenylazo-2-amino-8-hydroxy-naphthalene-3,6,6'-trisulfonic acid (blue-red),
1-(4'-amino)-naphthyl-(1')-azo-4-naphthyl-(1'')-azo-naphthalene-6(7),5''-trisulfonic acid (brown),
1-naphthyl-(1')-3-methyl-4-(6''-aminonaphthyl-2''-azo)-5-pyrazolone-4',4'',8'''-trisulfonic acid (orange),
1-amino-2-(4'-amino)-phenylazo-7-phenylazo-8-hydroxy-naphthalene-3,6,4''-trisulfonic acid (greenish black),
4-amino-4'-(4'''-methoxy)-naphthyl-(1''')-azostilbene-2,2'-disulfonic acid (orange),
1-(4'-amino)-benzoylamino-7-phenylazo-8-hydroxy-naphthalene-3,6,2''-trisulfonic acid (blue-red),
Copper complex compound of 1-hydroxy-2-(2'-hydroxy-5'-methyl)-phenylazo-6-amino-naphthalene-3,4'-disulfonic acid (violet),
Copper complex compound of 1-hydroxy-2-(2'-hydroxy)-naphthyl-(1')-azo-6-amino-naphthalene-3,4'-disulfonic acid (blue),
Copper complex compound of 1-(2'-hydroxy-3'-amino)-phenylazo-2-hydroxy-naphthalene-6,5'-disulfonic acid (blue-violet),
Nickel complex compound of 1-hydroxy-2-(2'-hydroxy)-phenylazo-6-amino-naphthalene-3,3',5'-trisulfonic acid (red-brown),
1:2-chromium complex compound of 1-hydroxy-2-(2'-hydroxy-3'-chloro)-phenylazo-6-amino-naphthalene-3,5'-disulfonic acid (navy-blue),
1:2-cobalt complex compound of 1-phenyl-3-methyl-4-(2''-hydroxy-3''-amino)-phenylazo-5-pyrazolone-4',5''-disulfonic acid (brown),
Mixed 1:2-chromium complex compound of 1-(2'-hydroxy-3'-chloro)-phenylazo-2-hydroxy-8-acetylamino-naphthalene-5'-sulfonic acid and 1-hydroxy-2-(2'-hydroxy-3'-chloro)-phenylazo-6-amino-naphthalene-3,5'-disulphonic acid (navy-blue),
Mixed 1:2-chromium complex compound of 1-(2'-hydroxy-5'-chloro)-phenylazo-2-hydroxy-8-acetylamino-naphthalene-3'-sulfonic acid and 1-hydroxy-2-(2'-hydroxy-5'-chloro)-phenylazo-6-amino-naphthalene-3,3'-disulfonic acid (navy-blue),
1:2-chromium complex compound of 1-hydroxy-2-(2'-hydroxy-5'-chloro)-phenylazo-6-amino-naphthalene-3,3'-disulfonic acid (navy-blue),
1:2-cobalt complex compound of 1-hydroxy-2-(2'-hydroxy-5'-chloro)-phenylazo-6-amino-naphthalene-3,3'-disulfonic acid (brown-violet),
1:2-cobalt complex compound of 1-hydroxy-2-(2'-hydroxy-3'-chloro)-phenylazo-6-amino-naphthalene-3,5'-disulfonic acid (brown-violet),
1:2-chromium complex compound of 1-hydroxy-2-(2'-hydroxy-5'-nitro)-phenylazo-6-amino-naphthalene-3,3'-disulfonic acid (navy-blue),
1:2-cobalt complex compound of 1-hydroxy-2-(2'-hydroxy-5'-nitro)-phenylazo-6-amino-naphthalene-3,3'-disulfonic acid (violettish-brown),
1:2-chromium complex compound of 1-hydroxy-2-(2'-hydroxy-3'-nitro)-phenylazo-6-amino-naphthalene-3,5'-disulfonic acid (navy-blue), 1:2-cobalt complex compound of 1-hydroxy-2-(2'-hydroxy-3'-nitro)-phenylazo-6-amino-naphthalene-3,5'-disulfonic acid (brown-violet),
1:2-chromium complex compound of 1-(2'-hydroxy)-phenylazo-2-hydroxy-8-amino-naphthalene-3,5'-disulfonic acid (gray),
1:2-chromium complex compound of 1-hydroxy-2-(2'-hydroxy-6'-nitro)-naphthyl-(1')-azo-6-amino-naphthalene-3,4'-disulfonic acid (navy-blue),
1:2-cobalt complex compound of 1-hydroxy-2-(2'-hydroxy-6'-nitro)-naphthyl-(1')-azo-6-amino-naphthalene-3,4'-disulfonic acid (brown-violet),
Mixed 1:2-chromium complex compound of 1-(2'-hydroxy-3'-nitro)-phenylazo-2-hydroxy-8-amino-naphthalene-5'-sulfonic acid and 1-hydroxy-2-(2'-hydroxy-3'-chloro)-phenylazo-6-amino-naphthalene-3,5'-disulfonic acid (navy-blue),
1:2-chromium complex compound of 1-hydroxy-2-(2'-hydroxy)-naphthyl-(1')-azo-6-amino-naphthalene-3,4'-disulfonic acid (navy-blue),
1-hydroxy-2(3'-amino)-phenylazo-naphthalene-4,6,6'-trisulfonic acid (red),
1-hydroxy-2(3'-amino)-phenylazo-naphthalene-4,7,6'-trisulfonic acid (red),
1-hydroxy-2(3'-amino)-phenylazo-naphthalene-3,6,6'-trisulfonic acid-8-sulfonic acid amide (blue-red),
Copper complex compound of 1-hydroxy-2-(2'-hydroxy)-phenylazo-8-amino-naphthalene-3,6,5'-trisulfonic acid (blue-violet),
Nickel complex compound of 1-hydroxy-2-(2'-hydroxy)-phenylazo-8-amino-naphthalene-3,6,5'-trisulfonic acid (violet),
Copper complex compound of 1-hydroxy-2-(2'-hydroxy-5'-chloro)-phenylazo-8-amino-naphthalene-3,6,3'-trisulfonic acid (blue-violet),
Copper complex compound of 1-hydroxy-2-(2'-hydroxy-3'-chloro)-phenylazo-8-amino-naphthalene-3,6,5'-trisulfonic acid (blue-violet),
Copper complex compound of 1-hydroxy-2-(2'-hydroxy-5'-methylsulfonyl)-phenylazo-8-amino-naphthalene-3,6-disulfonic acid (violet),
Copper complex compound of 1-hydroxy-2-(2'-hydroxy)-phenylazo-8-amino-naphthalene-3,6-disulfonic acid-5'-sulfonic acid amide (blue-violet),
Copper complex compound of 1-hydroxy-2-(2'-hydroxy)-phenylazo-8-amino-naphthalene-3,5,5'-trisulfonic acid (violet),
Copper complex compound of 1-hydroxy-2-(2'-hydroxy-5'-methylsulfonyl)-phenylazo-8-amino-naphthalene-3,5-disulfonic acid (violet),
Copper complex compound of 1-hydroxy-(2'-hydroxy-3'-carboxy)-phenylazo-8-amino-naphthalene-3,6,5'-trisulfonic acid (blue-violet),
Copper complex compound of 1-hydroxy-2-(2'-hydroxy-3'-carboxy)-phenylazo-8-amino-naphthalene-3,5,5'-trisulfonic acid (violet), 1-amino-7-phenylazo-8-hydroxynaphthalene-3,6,3'-trisulfonic acid (bluish-red),
2-(4'-amino)-phenylazonaphthalene-4,6,8-trisulfonic acid (orange),
1-(2',5'-dichloro)-phenyl-3-methyl-4-(3''-amino)-phenylazo-5-pyrazolone-4',6''-disulfonic acid (yellow),
1-amino-7-phenylazo-8-hydroxynaphthalene-3,6,2''-trisulfonic acid (blue-red),
1-(2'-chloro)-phenyl-3-methyl-4-(3''-amino)-phenylazo-5-pyrazolone-5',6''-disulfonic acid (yellow)
1-(2'-chloro-6'-methyl)-phenyl-3-methyl-4-(3''-amino)-phenylazo-5-pyrazolone-4',6''-disulfonic acid (yellow),
1-hydroxy-2-(3'-amino)-phenylazo-naphthalene-4,8,6'-trisulfonic acid (blue-red),
1-hydroxy-2-phenylazo-7-amino-naphthalene-3,2'-disulfonic acid (red),
4-amino-4'-(4''-methoxy)-phenylazo-1,1'-stilbene-2,2'-disulfonic acid (orange),
1-amino-7-(4'-methyl)-phenylazo-8-hydroxynaphthalene-3,6,6'-trisulfonic acid (blue-red),
1-amino-7-(4-chloro)-phenylazo-8-hydroxynaphthalene-3,6,6'-trisulfonic acid (blue-red),
1-amino-7-(4-phenylazo)-phenylazo-8-hydroxy-naphthalene-3,6,2',4''-tetrasulfonic acid (blue),
1-amino-7-(4'-acetylamino)-phenylazo-8-hydroxynaphthalene-4,6,6'-trisulfonic acid (violet),
1-amino-7-(3',4'-dichloro)-phenylazo-8-hydroxynaphthalene-4,6,6'-trisulfonic acid (blue-red),
1-amino-7-(3'-methyl-4'-chloro)-phenylazo-8-hydroxynaphthalene-4,6,6'-trisulfonic acid (blue-red),
1-amino-7-(2',4'-dimethyl)-phenylazo-8-hydroxynaphthalene-4,6,6'-trisulfonic acid (violet),
1-amino-7-(3',4'-dimethyl)-phenylazo-8-hydroxynaphthalene-4,6,6'-trisulfonic acid (violet),
1-amino-7-(4'-methyl)-phenylazo-8-hydroxynaphthalene-3,6-disulfonic acid (violet),
1-amino-7-phenylazo-8-hydroxynaphthalene-4,6,2'-trisulfonic acid (blue-red),
1-amino-7-naphthyl-(2')-azo-8-hydroxynaphthalene-3,6,5'-(8')-trisulfonic acid (blue-violet),
1-amino-7-naphthyl-(1')-azo-8-hydroxynaphthalene-3,6,4'-trisulfonic acid (reddish-blue)
1-amino-7-(4'-phenylazo)-phenylazo-8-hydroxynaphthalene-4,6,2',4''-tetrasulfonic acid (blue),
1-amino-7-(4'-phenylazo)-phenylazo-8-hydroxynaphthalene-3,6,4''-trisulfonic acid (blue),
1-amino-7-[4'-(2''-methyl)-phenylazo-3'-methyl]-phenylazo-8-hydroxynaphthalene-3,6,4''-trisulfonic acid (blue),
1-amino7-[4'-(4''-acetylamino)-phenyl]-phenylazo-8-hydroxynaphthalene-3,6,2'-trisulfonic acid (blue),
1-(3'-amino)-benzoylamino7-phenylazo-8-hydroxynaphthalene-4,6,2''-trisulfonic acid (blue-red),
1-(3'-amino)-benzoylamino-7-phenylazo-8-hydroxynaphthalene-3,6,4''-trisulfonic acid (violet),
1-hydroxy-2-phenylazo-6-amino-naphthalene-3,3'-disulfonic acid (orange-red),
1-hydroxy-2-(4'-methyl)-phenylazo-6-amino-naphthalene-3,2'-disulfonic acid (scarlet),
1-hydroxy-2(4'-chloro)-phenylazo-6-amino-naphthalene-3,2'-disulfonic acid (orange-red),
1-hydroxy-2-(4'-methoxy)-phenylazo-6-amino-naphthalene-3,2'-disulfonic acid (scarlet),
1-hydroxy-2-(4',6'-dimethyl)-phenylazo-6-amino-naphthalene-3,2'-disulfonic acid (orange-red),
1-hydroxy-2-(4'-chloro-6'-methyl)-phenylazo-6-amino-naphthalene-3,2'-disulfonic acid (orange-red),
1-hydroxy-2-(4'-acetylamino)-phenylazo-6-amino-naphthalene-3,2'-disulfonic acid (red),
1-hydroxy-2-(4'-phenylazo)-phenylazo-6-amino-naphthalene-3,2',4''-trisulfonic acid (blue-red),
1-hydroxy-2-phenylazo-6-aminonaphthalene-3,2'-disulfonic acid (orange-red),
1-hydroxy-2-naphthyl-2'-azo-6-amino-naphthalene-3,4',8'-trisulfonic acid (red),
1-hydroxy-2-naphthyl-2'-azo-6-amino-naphthalene-3,5',7'-trisulfonic acid (red), 1-hydroxy-2-naphthyl-2'-azo-7-amino-naphthalene-3,3',6'-trisulfonic acid (bluish red),
1-hydroxy-2-naphthyl-2'-azo-6-amino-naphthalene-3,6',8'-trisulfonic acid (red),
1-hydroxy-2-phenylazo-6-amino-naphthalene-3,2',4'-trisulfonic acid (scarlet),
1-hydroxy-2-phenylazo-7-amino-naphthalene-3,2',5'-trisulfonic acid (red),
1-hydroxy-2-naphthyl-2')-azo-7-amino-naphthalene-3,1'-disulfonic acid (blue-red),
1-hydroxy-2-(2'-carboxy)-phenylazo-6-amino-naphthalene-3,4'-disulfonic acid (orange-red),
1-hydroxy-2[4'-(6''-methyl)-benzothiazolyl-(2'')]-phenyl-azo-6-amino-naphthalene-3,2', X'''-trisulfonic acid (red),
1-hydroxy-2-(4'-phenylazo)-phenylazo-6-(4'''-aminophenylamino)-naphthalene-3,2',4'',3'''-tetrasulfonic acid (blue-violet),
1-hydroxy-2-(3',4'-dimethyl)phenylazo-6-amino-naphthalene-3,6'-disulfonic acid (scarlet),
1-hydroxy-2-(2'-methoxy)-phenylazo-7-amino-naphthalene-3,5'-disulfonic acid (blue-red),
1-hydroxy-2-naphthyl-(2')-azo-7-amino-naphthalene-3,4',8'-trisulfonic acid (blue-red),
1-hydroxy-2-(3'-amino)-phenylazo-7-amino-naphthalene-3,6'-disulfonic acid (scarlet),
1-hydroxy-2-(2'-methyl-4'-chloro)-phenylazo-7-amino-naphthalene-3,6'-disulfonic acid (red),
1-hydroxy-2-(4'-methyl)-phenylazo-7-amino-naphthalene-3,2'-disulfonic acid (red),
1-hydroxy-2-(4',6'-dimethyl)-phenylazo-7-amino-naphthalene-3,2'-disulfonic acid (red),
1-hydroxy-2-(4'-methoxy)-phenylazo-7-amino-naphthalene-3,2'-disulfonic acid (blue-red),
1-hydroxy-2-(4'-chloro)-phenylazo-7-amino-naphthalene-3,2'-disulfonic acid (red),
1-hydroxy-2-[4'-(4''-acetylamino)-phenyl]-phenylazo-7-amino-naphthalene-3,2'-disulfonic acid (blue-violet),
1-hydroxy-2-phenylazo-7-amino-naphthalene-3,4'-disulfonic acid (bluish red),
1-hydroxy-2-naphthyl-(2')-azo-7-amino-naphthalene-3,1',5'-trisulfonic acid (blue-red),
1-amino-7-[4'-(2''-methyl-4''-acetylamino)-phenyl-3'-methyl]-phenylazo-8-hydroxynaphthalene-3,6,5'-trisulfonic acid (violet),
1-amino-7-phenylazo-8-hydroxynaphthalene-3,6,4'-trisulfonic acid (blue-red),
1-amino-7-phenylazo-8-hydroxynaphthalene-3,6-disulfonic acid (blue-red),
1-amino-7-phenylazo-8-hydroxynaphthalene-4,6,4'-trisulfonic acid (blue-red),
1-amino-7-phenylazo-8-hydroxynaphthalene-4,6-disulfonic acid (blue-red),
1-amino-7-phenylazo-8-hydroxynaphthalene-4,6,3'-trisulfonic acid (blue-red),
1-amino-7-[4'-(4''-cyclohexyl)-phenoxy]-phenylazo-8-hydroxynaphthalene-3,6,2'-trisulfonic acid (violet),
1-amino-7-(2'-phenoxy)-phenylazo-8-hydroxynaphthalene-3,6,5'-trisulfonic acid (violet),
1-amino-7-(2'-methyl-4'-chloro)-phenylazo-8-hydroxynaphthalene-3,6,6'-trisulfonic acid (blue-red),
1-amino-7-(5',6',7',8'-tetrahydro)-naphthyl-2'-azo-8-hydroxynaphthalene-3,6,3'-trisulfonic acid (violet),
1-amino-7-(4'-chloro)-phenylazo-8-hydroxynaphthalene-4,6,2'-trisulfonic acid (blue-red),
1-amino-7-(4'-methyl)-phenylazo-8-hydroxynaphthalene-4,6,2'-trisulfonic acid (blue-red),
1-amino-7-(2',4'-dimethyl)-phenylazo-8-hydroxynaphthalene-4,6,6'-trisulfonic acid (blue-red),
1-amino-7-(2'-methyl-4'-chloro)-phenylazo-8-hydroxynaphthalene-4,6,6'-trisulfonic acid (blue-red),
1-amino-7-[4'-(4''-cyclohexyl)-phenoxy]-phenylazo-8-hydroxynaphthalene-4,6,2'-trisulfonic acid (blue-red),
1-hydroxy-2-naphthyl-(1')-azo-6-amino-naphthalene-3,4'-disulfonic acid (bluish red),
2-(4'-amino-2'-methyl)-phenylazo-naphthalene-3,6,8-trisulfonic acid (orange),
2-(4'amino)-phenylazo-naphthalene-4,6,8-trisulfonic acid (orange),
2-(4'-amino-2'-methyl-5'-methoxy)-phenylazonaphthalene-4,8-disulfonic acid (orange),
2-(4'-ethylamino-2'-methyl)-phenylazonaphthalene-4,8-disulfonic acid (orange),
2-(4'-methylamino-2'-methoxy)-phenylazonaphthalene-4,8-disulfonic acid (orange),
2-(4'-amino-3'-methyl)-phenylazonaphthalene-4,8-disulfonic acid (orange),
2-(4'-amino-2'-methylsulfonylamino)-phenylazonaphthalene-4,8-disulfonic acid (orange),
2-(4'-amino-2',5'-dimethyl)-phenylazonaphthalene-4,8-disulfonic acid (orange),
2-[4'-(4''-amino-2''-methyl)-phenylazo-2'-methyl]-phenylazonaphthalene-4,8-disulfonic acid (orange-brown),
2-[4'-(4''-amino-2''-methyl)-phenylazo-2'-methyl]-phenylazonaphthalene-4,6,8-trisulfonic acid (orange-brown),
2-[4'-(4''-amino-2''-acetylamino)-phenylazo]-phenyl-6-methylbenzothiazol-x,3'-disulfonic acid (orange),
1-(4'-amino-2'-methyl)-phenylazo-4-phenylazobenzol-2,4''-disulfonic acid (orange-brown),
4'-amino-1,1'-azobenzol-2,4-disulfonic acid (yellow-orange),
4'-amino-2'-methyl-1,1'-azobenzol-2,5-disulfonic acid (yellow orange),
2-(4'-amino-2'-methyl)-phenylazonaphthalene-3,6,8-trisulfonic acid (orange),
1-(4'-amino-2'-methyl)-phenylazonaphthalene-3,6,8-trisulfonic acid (orange-brown),
1-(4'-amino-2'-methoxy-5'-methyl)-phenylazonaphthalene-4,8-disulfonic acid (orange-brown),
1-(4'-amino)-phenylazo-naphthalene-3,6'-disulfonic acid (orange-brown),
1-(4'-amino-2'-methyl)-phenylazonaphthalene-3,8-disulfonic acid (orange-brown),
2-(4'-amino-2',3'-tetramethylene)-phenylazonaphthalene-4,6,8-trisulfonic acid (orange-brown),
2-(4'-amino)-naphthyl-(1')-azo-naphthalene-4,6,8-trisulfonic acid (orange-brown),
2-(4'-amino-3'-methoxy)-naphthyl-(1')-azo-naphthalene-4,6,8-trisulfonic acid (orange-brown),
2-(4'-amino)-naphthyl-(1')-azo-naphthalene-4,8,7'-trisulfonic acid (orange-brown),
2-(4'-amino)-naphthyl-(1')-azo-naphthalene-5,7,6'-trisulfonic acid (orange-brown),
2-(4'-amino-3'-ethoxy)-naphthyl-(1')-azo-naphthalene-4,6,8-trisulfonic acid (orange-brown),
4'-amino-naphthyl-(1')-azo-benzene-2,5-disulfonic acid (brown-orange),
4'-amino-3'-ethoxy-naphthyl-(1')-azo-benzene-2,4-disulfonic acid (brown-orange),
4'-amino-naphthyl-(1')-azo-benzene-4,7'-disulfonic acid (brown-orange),
4'-Aminonaphthyl-(1')-azo-benzene-3,6'-disulfonic acid (brown-orange), 4-aminonaphthyl-(1')-azo-benzene-2,4,7'-trisulfonic acid (brown-orange),
2-[4'(4''-amino-2''-methyl)-phenylazo]-naphthyl-(1')-azo-naphthalene-4,6,8-trisulfonic acid (red-brown),
2-[4'-(4''-amino)-naphthyl-(1')-azo]-naphthyl-(1')-azo-naphthalene-4,6,8-trisulfonic acid (red-brown),
2-[4'-(4''-amino)-naphthyl-(1''')-azo]-naphthyl-(1')-azo-naphthalene-3,6,8-tetrasulfonic acid (red-brown),
2-[4'-(4''-amino)-naphthyl-(1''')-azo]-naphthyl-(1')-azo-naphthalene-4,8,7',7''-tetrasulfonic acid (red-brown),
2-[4'-(4''-amino)-naphthyl-(1''')-azo]-phenylazonaphthalene-3,6,2',6''-tetrasulfonic acid (orange-brown),
1-[(4''-amino)-naphthyl-(1''')-azo]-naphthyl-(1')-azo-benzene-2,4,7'-trisulfonic acid (red-brown),
1-[4'-(4''-amino-2''-methyl)-phenylazo]-naphthyl-(1')-azo-benzene-2,4,7'-trisulfonic acid (orange-brown),
1-[4'-(4''-amino)-naphthyl-(1''')-azo]-phenylazobenzene-2',4-disulfonic acid (orange-brown),
1-[4'-(4''-amino)-naphthyl-(1''')-azo]-azo-phenylazobenzene-2',4,7''-trisulfonic acid (orange-brown),
1-[4'-(4''-amino-naphthyl-(1''')-azo-2'-methyl]-phenylazo-naphthalene-4,6,8-trisulfonic acid (orange-brown),
1-(4'-amino)-phenyl-3-methyl-4-phenylazo-5-pyrazolone-2'',4''-disulfonic acid (orange-brown),
1-(4'-amino)-phenyl-3-methyl-4-naphthyl-(1''')-azo-5-pyrazolone-3'',6''-disulfonic acid (orange),
1-(3'-amino)-phenyl-3-methyl-4-phenylazo-5-pyrazolone-2'',5''-disulfonic acid (orange-yellow),
1-(3'-amino)-phenyl-3-carboxy-4-naphthyl-(2'')-azo-5-pyrazolone-4'',8''-disulfonic acid (orange),
1-(3'-amino)-phenyl-3-methyl-4-naphthyl-(2'')-azo-5-pyrazolone-4'',6'',8''-trisulfonic acid (orange),
1-[4'-(4''-amino-3''-ethoxy)-naphthyl-(1''')-azo]-naphthyl-(1'')-azo-naphthalene-3,8,7'-trisulfonic acid (red-brown),
1-hydroxy-2-[4'-(4''-amino-3''-methyl)-phenyl-2'-methyl]-phenylazo-naphthalene-4,5',6''-trisulfonic acid (red),
4'-amino-4-(4''-phenylazo)-phenylazo-stilbene-2,2',-4'''-trisulfonic acid (orange),
1-(2',3',6'-trichloro)-phenyl-3-methyl-4-(3''-amino)-phenylazo-5-pyrazolone-5',6''-disulfonic acid (yellow),
1-(2'-chloro)-phenyl-3-methyl-4-[3''-(4'''-amino)-benzoylamino]-phenylazo-5-pyrazolone-4',6''-disulfonic acid (orange),
1-(2'-chloro-6'-methyl)-phenyl-3-methyl-4-(3''-amino)-phenylazo-5-pyrazolone-4',6''-disulfonic acid (yellow),
1-(2'-chloro)-phenyl-3-methyl-4-(3''-amino)-phenylazo-5-pyrazolone-4',6''-disulfonic acid (yellow),
1-(2',3'-tetramethylene)-phenyl-3-methyl-4-(3''-amino)-phenylazo-5-pyrazolone-4',6''-disulfonic acid (orange),
1,8-dihydroxy-2-(3'-amino)-phenylazonaphthalene-3,6,6'-trisulfonic acid (blue-red),
1-(3'-amino)-phenylazo-2-amino-8-hydroxynaphthalene-6,6'-disulfonic acid (blue-red),
1-(3'-amino)-phenylazo-2-amino-8-hydroxynaphthalene-3,6,6'-trisulfonic acid (blue-red),
1-hydroxy-2-(3'-amino)-phenylazo-8-(2''-chloro)-benzoylaminonaphthalene-3,5,6'-trisulfonic acid (blue-red), 1-hydroxy-2-(3'-amino)-phenylazo-8-acetylaminonaphthalene-3,5,6'-trisulfonic acid (blue-red),
1-hydroxy-2-(4'-amino)-phenylazo-naphthalene-4,2'-disulfonic acid (blue-red),
1-hydroxy-2-(4'-amino)-phenylazonaphthalene-3,6,2'-trisulfonic acid (blue-red),
1-hydroxy-2-(4'-amino)-phenylazo-8-chloronaphthalene-3,6,2'-trisulfonic acid (blue-red),
1-hydroxy-2-(4'-amino)-phenylazo-6-acetylaminonaphthalene-3,2'-disulfonic acid (red),
1-hydroxy-2-(4'-amino)-phenylazo-7-acetylaminonaphthalene-3,2-disulfonic acid (blue-red),
1(4'-amino)-phenylazo-2-amino-8-hydroxynaphthalene-6,2'-disulfonic acid (blue-red),
1-(4'-amino)-phenylazo-2-amino-8-hydroxynaphthalene-3,6,2'-trisulfonic acid (blue-red),
1,8-dihydroxy-2-(4'-amino)-phenylazo-naphthalene-3,6,2'-trisulfonic acid (blue-violet),
1-hydroxy-2-(4'-amino)-phenylazo-8-acetylaminonaphthalene-3,6,2'-trisulfonic acid (violet),
1-hydroxy-2-(4'-amino)-phenylazo-8-(3'',4''-dichloro)-benzoylaminonaphthalene-3,6,2'-trisulfonic acid (violet),
1-[4'-(4''-amino)-phenyl]-phenylazo-2-amino-8-hydroxy-naphthalene-3,6,2'-trisulfonic acid (violet),
1-hydroxy-2-[4'-(4''-amino)-phenyl]-phenylazo-8-acetyl aminonaphthalene-6,3,2'-trisulfonic acid (blue-violet),
1-hydroxy-2-[4'-(4''-amino)-phenyl]-phenylazo-8-benzoylamino-naphthalene-3,6,2'-trisulfonic acid (blue-violet),
1-hydroxy-2-[4'-(4''-amino)-phenyl]-phenylazo-8-acetyl-aminonaphthalene-3,5,2'-trisulfonic acid (blue-violet),
1-hydroxy-2-[4'-(4''-amino)-phenyl]-phenylazo-8-(4'''-methyl)-benzoylaminonaphthalene-3,5,2'-trisulfonic acid (blue-violet),
1-[(4''-amino)-stilbenyl-(4')]-3-methyl-4-phenylazo-5-pyrazolone-2',2'',2'''-trisulfonic acid (orange-yellow),
1-[(4''-amino-stilbenyl-(4')]-3-methyl-4-(2'''-carboxy)-phenylazo-5-pyrazolone-2',2'',4'''-trisulfonic acid (orange-yellow),
1-(3'-amino)-phenyl-3-methyl-4-phenylazo-5-pyrazolone-2'',5''-disulfonic acid (orange-yellow),
1-(3'-amino)-phenyl-3-carboxy-(4''-phenylazo)-phenylazo-5-pyrazolone-2'',4'''-disulfonic acid (scarlet),
1-(2'-chloro-4'-amino-phenyl-3-methyl-4-phenylazo-5-pyrazolone-2'',4'''-disulfonic acid (orange-yellow),
1-[4'-(4''-amino)-phenyl]-phenyl-3-methyl-4-naphthyl-(2''')-azo-5-pyrazolone-4''',8'''-disulfonic acid (orange),
1-hydroxy-2-phenylazo-8-(3''-amino)-benzoylaminonaphthalene-3,6,2'-trisulfonic acid (blue-red),
1-hydroxy-2-[4'-(4''-amino-2''-methyl)-phenyl-3'-methyl]-phenylazonaphthalene-4,6',5''-trisulfonic acid (red),
1-hydroxy-2-(3'-amino)-phenylazo-8-ethoxynaphthalene-3,6,6'-trisulfonic acid (red),
1-hydroxy-2-[4'-(4''-amino-2''-methyl)-phenyl-3'-methyl]-phenyl-azo-8-ethoxy-naphthalene-3,6,6'-trisulfonic acid (blue-red),
1-hydroxy-2-[4'-(4''-amino-2''-methyl)-phenyl-3'-methyl]-phenylazo-8-naphthalene-3,6,6'-trisulfonic acid (blue-red),
1-hydroxy-2-(4'-amino)-phenylazo-8-ethoxy-naphthalene-3,6,2'-trisulfonic acid (violet), 1-hydroxy-2-(3'-amino)-phenylazo-8-(3''-amino)-benzoylaminonaphthalene-3,6,6'-trisulfonic acid (blue-red), 1-hydroxy-2-(3'-amino)-phenylazo-8-(4''-amino)-benzoylaminonaphthalene-3,6,6'-trisulfonic acid (blue-red), 1-hydroxy-2-(3'-amino)-phenylazo-8-[4'',6''-dihydroxy-1'',3'',5''-triazinyl-(2'')]-aminonaphthalene-3,6,6'-trisulfonic acid (blue-red), 1-hydroxy-2-(3'-amino)-phenylazo-8-[4'',6''-diamino-1'',3'',5''-triazinyl-(2'')]-amino-naphthalene-3,6,6'-trisulfonic acid (blue-red), 1-hydroxy-2-(3'-amino)-phenylazo-8-[4'',6''-bis-(4'''-sulfophenyl)-1'',3'',5''-triazinyl-(2'')]-aminonaphthalene-3,6,6'-trisulfonic acid (blue-red), 1-hydroxy-2-(3-amino)-phenylazo-8-(3'-amino)-benzoylaminonaphthalene-3,6,6'-trisulfonic acid (blue-red), 1-hydroxy-2-(3'-amino)-phenylazo-7-(3''-amino)-phenylazo-8-amino-naphthalene-3,6,6',6''-tetrasulfonic acid (blue-gray), 1-hydroxy-2-(4'-amino)-phenylazo-7-(4''-amino)-phenylazo-8-amino-naphthalene-3,6,2',2''-tetrasulfonic acid (greenish black), 1-hydroxy-2-(3'-amino)-phenylazo-8-(4''-amino)-benzoylaminonaphthalene-3,6,6'-trisulfonic acid (blue-red), 1:2-chromium complex compound of 1-hydroxy-2-(2'-hydroxy-5'-nitro)-phenylazo-8-aminonaphthalene-3,6-disulfonic acid (greenish black), 1:2-chromium complex compound of 1-hydroxy-2-(2'-hydroxy-5'-chloro)-phenylazo-8-aminonaphthalene-3,6-disulfonic acid (navy-blue), 1:2-chromium complex compound of 1-hydroxy-2-(2'-hydroxy-4'-nitro-5'-chloro)-phenylazo-8-aminonaphthalene-3,6-disulfonic acid (navy-blue), 1:2-chromium complex compound of 1-hydroxy-2-(2'-hydroxy-3'-chloro-5'-nitro)-phenylazo-8-aminonaphthalene-3,6-disulfonic acid (navy-blue), 1:2-chromium complex compound of 1-hydroxy-2-(2'-hydroxy-3'-nitro-5'-chloro)-phenylazo-8-aminonaphthalene-3,6-disulfonic acid (navy-blue), 1:2-chromium complex compound of 1-hydroxy-2-(2'-hydroxy-3',5'-dinitro)-phenylazo-8-aminonaphthalene-3,6-disulfonic acid (greenish black), 1:2-cobalt complex compound of 1-hydroxy-2-(2'-hydroxy-5'-chloro)-phenylazo-8-aminonaphthalene-3,6-disulfonic acid (navy-blue), 1:2-cobalt complex compound of 1-hydroxy-2-(2'-hydroxy-4'-nitro-5'-chloro)-phenylazo-8-aminonaphthalene-3,6-disulfonic acid (navy-blue), 1:2-cobalt complex compound of 1-hydroxy-2-(2'-hydroxy-3'-chloro-5'-nitro)-phenylazo-8-aminonaphthalene-3,6-disulfonic acid (navy-blue), 1:2-cobalt complex compound of 1-hydroxy-2-(2'-hydroxy-3'-nitro-5'-chloro)-phenylazo-8-aminonaphthalene-3,6-disulfonic acid (navy-blue), 1:2-cobalt complex compound of 1-hydroxy-2-(2'-hydroxy-3',5'-dinitro)-phenylazo-8-aminonaphthalene-3,6-disulfonic acid (bluish black), 1:2-chromium complex compound of 1-hydroxy-2-(2'-hydroxy-5'-nitro)-phenylazo-8-aminonaphthalene-3,5-disulfonic acid (navy-blue), 1:2-chromium complex compound of 1-hydroxy-2-(2'-hydroxy-5'-chloro)-phenylazo-8-aminonaphthalene-3,5-disulfonic acid (navy-blue), 1:2-chromium complex compound of 1-hydroxy-2-(2'-hydroxy-5'-nitro)-phenylazo-7-aminonaphthalene-3,6-disulfonic acid (navy-blue), 1:2-chromium complex compound of 1-hydroxy-2-(2'-hydroxy-5'-chloro)-phenylazo-7-aminonaphthalene-3,6-disulfonic acid (navy-blue), 1:2-chromium complex compound of 1-hydroxy-2-(2'-hydroxy-5'-chloro)-phenylazo-8-aminonaphthalene-5,7-disulfonic acid (navy-blue), 1:2-cobalt complex compound of 1-hydroxy-2-(2'-hydroxy-5'-nitro)-phenylazo-8-aminonaphthalene-3,5-disulfonic acid (navy-blue), 1:2-cobalt complex compound of 1-hydroxy-2-(2'-hydroxy-5'-chloro)-phenylazo-8-aminonaphthalene-3,5-disulfonic acid (navy-blue), 1:2-cobalt complex compound of 1-hydroxy-2-(2'-hydroxy-5'-nitro)-phenylazo-7-aminonaphthalene-3,6-disulfonic acid (navy-blue), 1:2-cobalt complex compound of 1-hydroxy-2-(2'-hydroxy-5'-chloro)-phenylazo-7-aminonaphthalene-3,6-disulfonic acid (navy-blue), 1:2-cobalt complex compound of 1-hydroxy-2-(2'-hydroxy-5'-chloro)-phenylazo-8-aminonaphthalene-5,7-disulfonic acid (navy-blue), Copper complex compound of 1-hydroxy-2-(1'-hydroxy)-naphthyl-(2')-azo-8-aminonaphthalene-3,6,6'-trisulfonic acid (reddish blue), Copper complex compound of 1-hydroxy-2-(1'-hydroxy)-naphthyl-(2')-azo-8-aminonaphthalene-3,6,8'-trisulfonic acid (reddish blue), Copper complex compound of 1-hydroxy-2-(1'-hydroxy)-naphthyl-(2')-azo-8-aminonaphthalene-3,6,4'-trisulfonic acid (blue), Copper complex compound of 1-hydroxy-2-(1'-hydroxy)-naphthyl-(2')-azo-8-aminonaphthalene-5,4',8'-trisulfonic acid (blue), Copper complex compound of 1-hydroxy-2-(1'-hydroxy)-naphthyl-(2')-azo-8-aminonaphthalene-3,6,5'-trisulfonic acid (reddish blue), Copper complex compound of 1-phenyl-3-methyl-4-(2''-hydroxy-6''-amino)-naphthyl-(1')-azo-5-pyrazolone-2',4',4''-trisulfonic acid (yellowish brown), 1:2-cobalt complex compound of 1-phenyl-3-methyl-4-(2''-hydroxy-3''-amino)-phenylazo-5-pyrazolone-4',5''-disulfonic acid (yellowish brown), 1:2-cobalt complex compound of 1-(2',5'-dichloro)-phenyl-3-methyl-4-(2''-hydroxy-3''-amino)-phenylazo-5-pyrazolone-4',5''-trisulfonic acid (yellowish brown), 1:2-cobalt complex compound of 1-phenyl-3-methyl-4-(2''-hydroxy-3''-amino-5''-nitro)-phenylazo-5-pyrazolone-2',5'-disulfonic acid (yellowish brown), 1:2-cobalt complex compound of 1-(2',5'-dichloro)-phenyl-3-methyl-4-(2''-hydroxy-6''-amino)-naphthyl-(1'')-azo-5-pyrazolone-4',4''-disulfonic acid (brown), 1:2-chromium complex compound of 1-phenyl-3-methyl-4-(2''-hydroxy-3''-amino)-phenylazo-5-pyrazolone-4',5''-disulfonic acid (orange-red), 1:2-chromium complex compund of 1-(2',5'-dichloro)-phenyl-3-methyl-4-(2''-hydroxy-3''-amino)-phenylazo-5-pyrazolone-4',5'''-trisulfonic acid (orange), 1:2-chromium complex compound of 1-phenyl-3-methyl-4-(2''-hydroxy-3''-amino-5''-nitro)-phenylazo-5-pyrazolone-2',5'-disulfonic acid (orange), 1-hydroxy-2-(4'-methoxy)-phenylazo-1-methylaminonaphthalene-3,2'-disulfonic acid (red), 1-hydroxy-2-phenylazo-6-ethylamino-naphthalene-3,2',5'-trisulfonic acid (scarlet), 1-phenyl-3-methyl-4-[4''-(4'''-amino-2'''-methyl)-phenyl-3''-methyl]-phenylazo-5-pyrazolone-2',5',6''-trisulfonic acid (reddish yellow), 4-amino-4'-(4'-methoxy)-phenylazo-stilbene-2,2'-disulfonic acid (orange), 1-naphthyl-(2')-3-methyl-4-[4''-(4'''-amino)-phenyl]-phenylazo-5-pyrazolone-4',8',2''-trisulfonic acid (brown-orange), 1-phenyl-3-methyl-4-[4''-(3''''-amino)-phenyl-azo-3''-methyl]-phenylazo-5-pyrazolone-2',4',6'''-trisulfonic acid (orange-brown), 1-phenyl-3-methyl-4-[4''-(4''''-amino)-phenylazo-2''-methoxy-5''-methyl]-phenylazo-5-pyrazolone-2',5',2''''-trisulfonic acid (orange-brown), 1-naphthyl-(2')-3-methyl-4-[4''''-amino)-phenylazo-3''-methyl]-phenylazo-5-pyrazolone-4',8',2''''-trisulfonic acid (orange-brown), 1-naphthyl-(2')-3-methyl-4-[4''-(4'''-amino)-phenylazo-3''-methyl]-phenylazo-5-pyrazolone-5',7',2''''-trisulfonic acid (orange-brown), 1-(4''-amino)-stilbenyl-(4')-3-methyl-4-(4'''-phenylazo)-phenylazo-5-pyrazolone-2',2'',2''',4''''-tetrasulfonic acid (orange-brown), 1-hydroxy-2-(4'-phenylazo)-7-amino-naphthalene-3,2',4''-trisulfonic acid (blue-red), 1-(4'-amino-2'-methylsulfonylamino)-phenylazo-3-methyl-4-phenylazobenzene-2'',4''-disulfonic acid (orange-brown), 1-(4'-amino-2'-sulfoacetylamino)-phenylazo-3-methyl-4-phenylazobenzene-2'',4''-disulfonic acid (orange-brown), 2-[4'-(4''-amino)-naphthyl-(1'')-azo]-phenylazonaphthalene-4,6,8,7'-tetrasulfonic acid (orange-brown), 2-[4'-(4''-amino-3''-ethoxy)-naphthyl-(1'')-azo]-phenylazonaphthalene-4,8,3'-trisulfonic acid (orange-brown), 2-[4'-(1''-hydroxy-6''-amino)-naphthyl-(2'')-azo-2'-methyl]-phenylazonaphthalene-6,8,3'-trisulfonic acid (blue-red), 1-[4'-(1''-hydroxy-6''-amino)-naphthyl-(2'')-azo]-naphthyl-(1')-azobenzene-4,7',3''-trisulfonic acid (blue-violet), 1-[4'-(4''-amino)-naphthyl-(1''')-azo-3'-ethoxy]-naphthyl-(1')-azo-benzene-2,4,6''-trisulfonic acid (red-brown), 4-(4''-amino-2''-methyl)-phenylazo-4'-(1''''-hydroxy)-naphthyl-(2''')-azo-3,3'-dimethyl-1,1'-diphenyl-6,6',4'''-trisulfonic acid (red), 4-(4''-amino-3''-methoxy-6''-methyl)-phenylazo-4'-(1''''-hydroxy)-naphthyl-(2''')-azo-1,1'-diphenyl-2,2',4''',6'''-tetrasulfonic acid (red), 4-(4''-acetylamino)-phenylazo-4'-(1''''-hydroxy-6''''-amino)-naphthyl-(2''')-azo-1,1'-diphenyl-2,2',3'''-trisulfonic acid (red), 4-(4''-amino-2''-methyl)-phenylazo-4'-(1''''-hydroxy)-naphthyhl-(2''')-azo-2,2'-dimethyl-1,1'-diphenyl-5',3''',6'''-trisulfonic acid (red), 4-(4''-amino-2''-sulfoacetylamino)-phenylazo-4'-(1''λ'-hydroxy)-naphthyl-(2''')-azo-2,2'-dimethyl-1,1'-diphenyl-5',4'''-disulfonic acid (red), 4-(4''-amino-2''-methyl)-phenylazo-4'-(2''''-hydroxy)-naphthyl)-(1''')-azo-3,3'-dimethyl-1,1'-diphenyl-6,6',3''',6'''-tetrasulfonic acid (red), 4-(4''-amino-2''-methyl)-phenylazo-4'-(1''''-hydroxy-8-amino)-naphthyl-(2''')-azo-2,2'-dimethyl-1,1'-diphenyl-5,3''',6'''-trisulfonic acid (red-violet), 4-(4''-amino-2''-acetylamino)-phenylazo-4'-(2'''-hydroxy)-naphthyl-(1''')-azo-1,1'-diphenyl-5,3'''-tetrasulfonic acid (red).

The acylation of such a dyestuff containing an acylatable amino group with one of the aforesaid dihalogenpropionic acid halides or anhydrides is advantageously carried out in the presence of an acidbinding agent such as sodium acetate, sodium hydroxide or sodium hydrogen carbonate and under relatively mild conditions, for example, in an organic solvent or at a relatively low temperature in an aqueous medium.

The dyestuffs of this invention are new. They are suitable for dyeing or printing especially polyhydroxylated materials of fibrous structure such as cellulosic materials, and also synthetic fibers, for example, of regenerated cellulose, or natural materials, for example, cellulose, linen or above all cotton. They are suitable for dyeing by the so-called direct dyeing methods and also by printing or foularding dyeing methods, especially from aqueous alkaline solutions, which may contain a high content of salts, for example, by the process in which the dyestuff is fixed on the material to be dyed by a heat treatment, for example, by steaming, in the presence of an alkali, or preferably by storing the dyed or printed material at room-temperature or at a slightly elevated temperature, e.g. at a temperature between 15° and 40°C for 1 to 24 hours according to the so-called cold-pad-batch-process. Due to the reactive dihalogenopropionylamino substituent a chemical bonding is formed between the chromophore of the azo dyestuff and the cellulosic fiber during the fixation process.

In order to remove non-fixed dyestuff and to improve the properties of wet fastness of the dyeings so produced on cellulose fibers the dyeings are thoroughly rinsed with cold and hot water. Advantageously they may also be treated with a dilute and advantageously slightly alkaline boiling solution of a nonionic detergent or a dispersing agent for a short time, for example, 5–10 minutes.

Dyeings produced on cellulosic fibers with the dyestuffs of this invention are usually distinguished by the purity of their tints, by their good fastness to light and above all by their excellent fastness to washing.

The following Examples illustrate the invention, the parts and percentages being by weight:

EXAMPLE 1

10.44 parts of the dyestuff of the formula

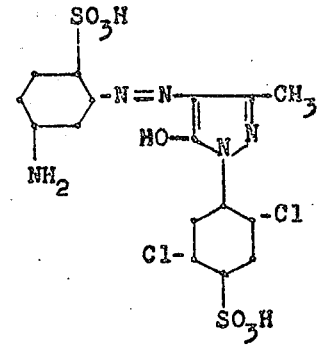

are neutralized with sodium carbonate in 350 parts of water, and 3.4 parts of sodium bicarbonate are added. While stirring vigorously, a solution of 4.8 parts of α:β-dichloropropionyl chloride in 10 parts of toluene is added dropwise at 0°–5°C within 10 minutes. After ½ hour the new dyestuff formed is salted out with 100 parts of sodium chloride, filtered off and dried in vacuo at 50° to 60°C.

The dyestuff dyes cotton greenish yellow tints by the process described in Example 13.

When the above dyestuff is acylated with 7.5 parts of α:β-dibromopropionyl chloride instead of 4.8 parts of α:β-dichloropropionyl chloride, a product is obtained which likewise dyes cotton fast greenish yellow tints.

EXAMPLE 2

8.76 parts of the dyestuff of the formula

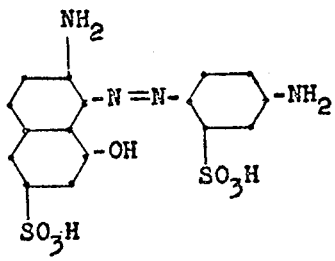

are neutralized with sodium carbonate in 300 parts of water, and 6.56 parts of anhydrous sodium acetate are added. While stirring vigorously, a solution of 3.8 parts of α:β-dichloro propionyl chloride in 5 parts of toluene is added dropwise at 0°–5°C within 10 minutes. After a short time the acylation of the amino group is complete. The dyestuff is salted out with 70 parts of sodium chloride, filtered off and dried in vacuo at 60° to 70°C. The dyestuff obtained in this manner dyes cotton bluish red tints.

When the above dyestuff is acylated with an equivalent amount of α:β-dibromopropionyl chloride instead of α:β-dichloropropionyl chloride, a product is obtained which dyes cotton by the method described in Example 11 bluish red tints.

EXAMPLE 3

5.18 parts of the dyestuff of the formula

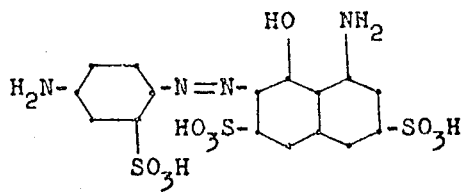

are neutralized with sodium carbonate in 300 parts of water, and this solution is mixed at room temperature dropwise with a solution of 10 parts of α:β-dichloropropionyl chloride in 15 parts of acetone, and by the simultaneous dropwise addition of aqueous sodium carbonate solution the pH value of the solution is maintained between 7 and 8. After complete acylation of the two amino groups the dyestuff is salted out with 100 parts of sodium chloride and dried in vacuo at 50° to 60°C. The dyestuff dyes cotton bluish-red tints.

By acylating the aminoazo dyestuffs in Column I with α:β-dichloropropionyl chloride as described in the preceding Examples further dyestuffs are obtained that dye cotton the tints shown in Column II.

| I | II |
|---|---|
| 1 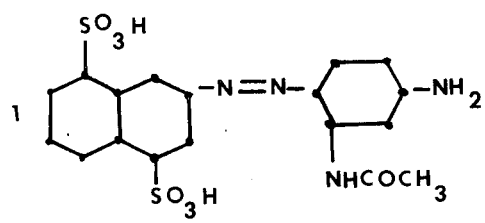 | reddish yellow |
| 2 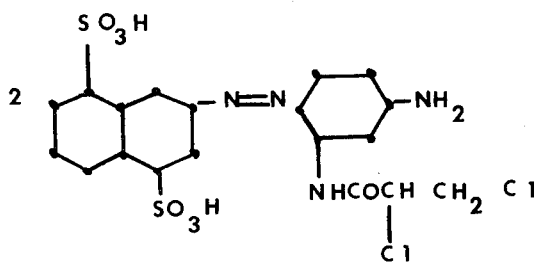 | '' |
| 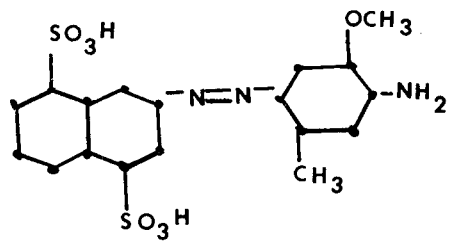 | reddish yellow |
| 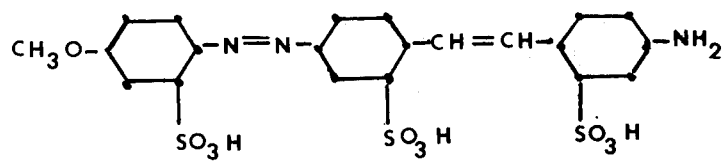 | yellow |

| I | II |
|---|---|
| 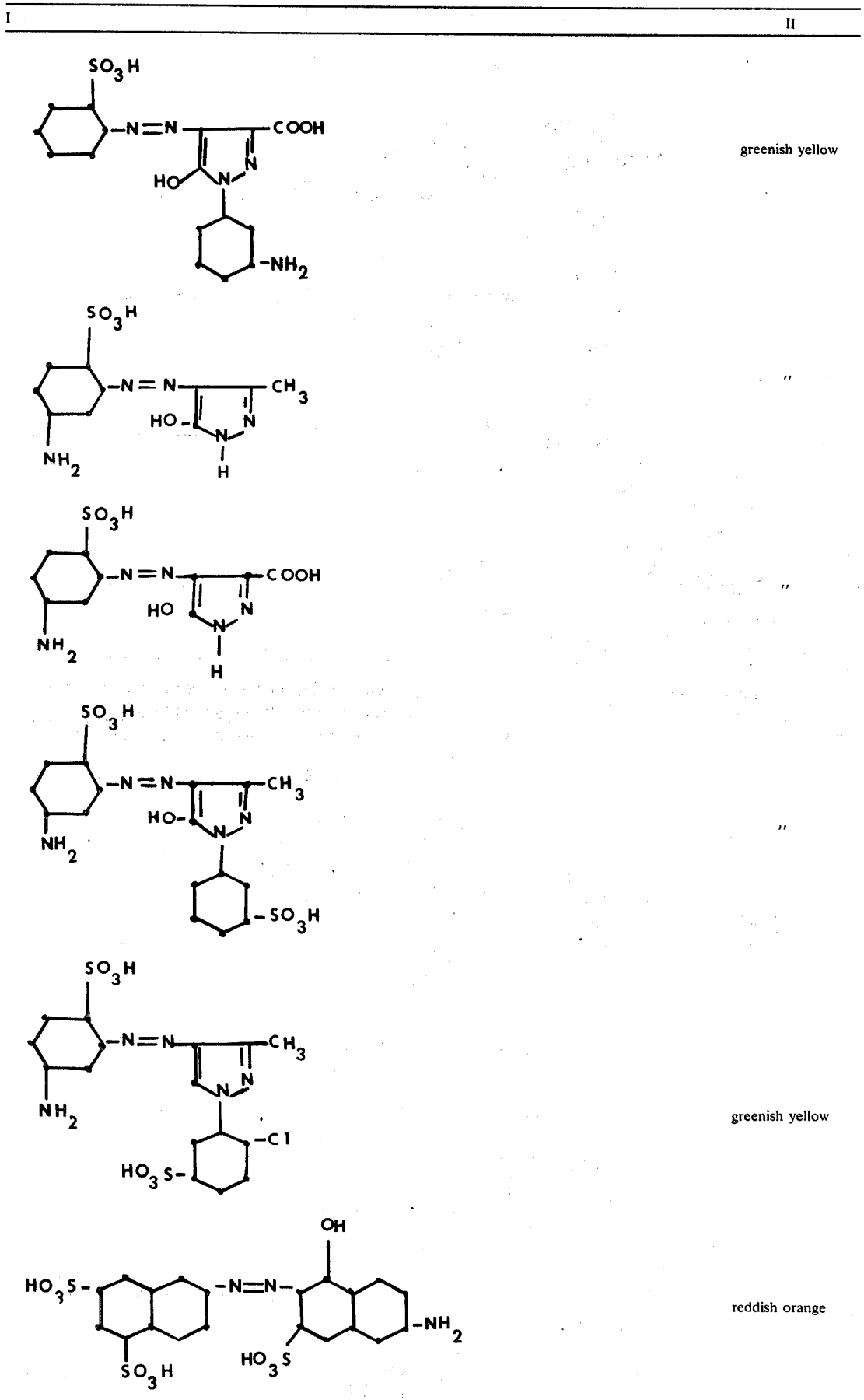 | greenish yellow |
| | " |
| | " |
| | " |
| | greenish yellow |
| | reddish orange |

| I | II |
|---|---|
| 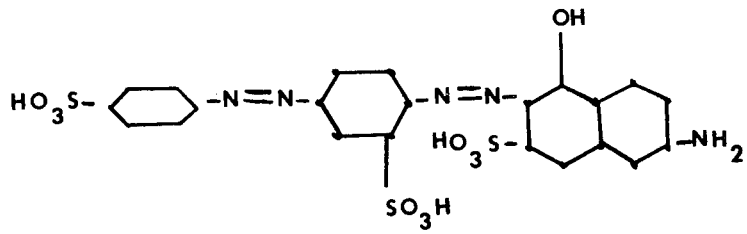 | scarlet |
| 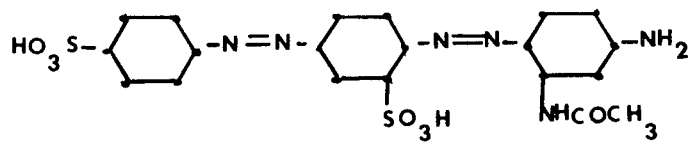 | yellow orange |
| 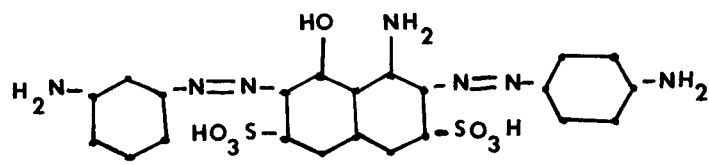 | greenish black |
| 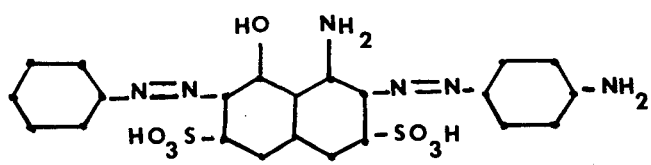 | greenish black |
By acylating the aminoazodyestuffs of Column I of the following table as described in the preceeding Examples, but with an equivalent amount of α:β-dibromo-propionylchloride, further dyestuffs are obtained that dye cotton the tints shown in Column II
| I | II |
|---|---|
| 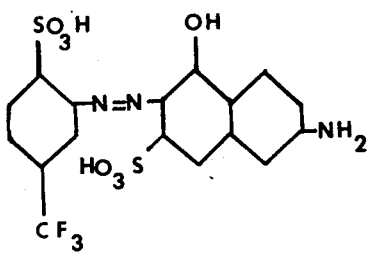 | scarlet |
| 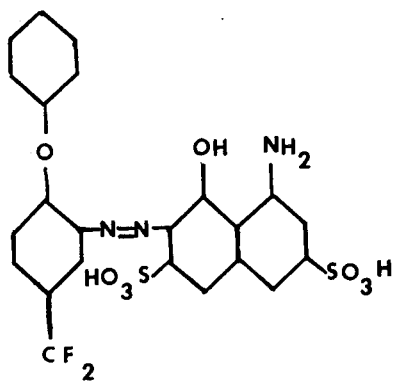 | red |
| 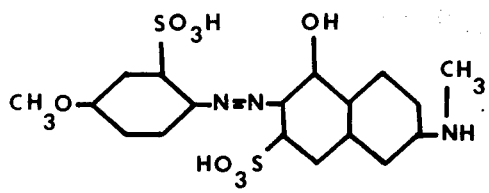 | scarlet |

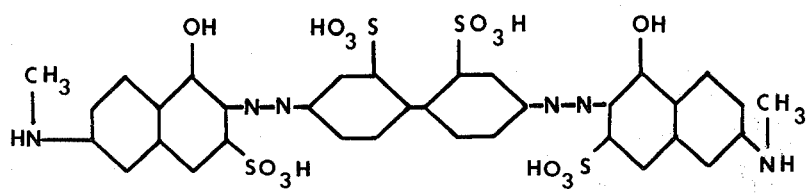 scarlet

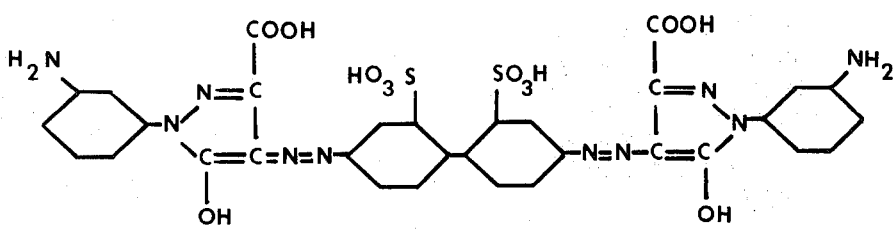 reddish yellow

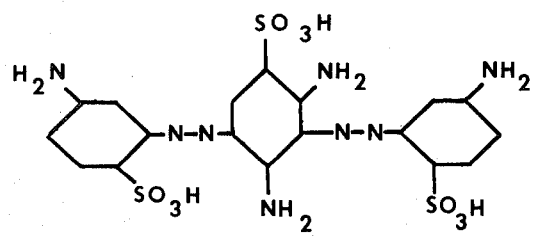 reddish yellow

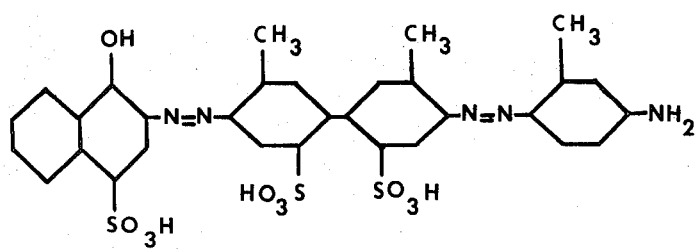 scarlet

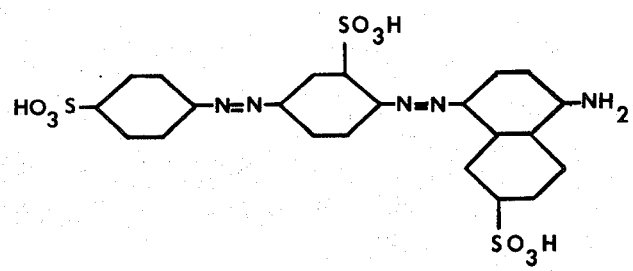 brown

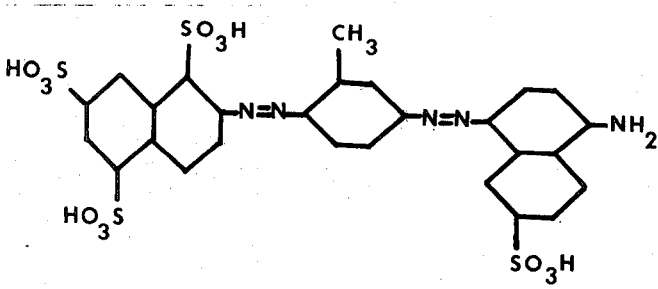 brown

EXAMPLE 4

53.0 parts of the dyestuff of the formula

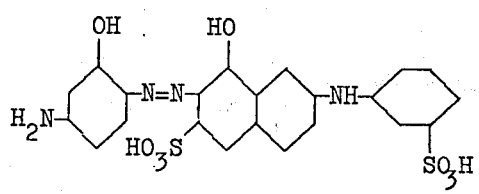

are neutralized with sodium carbonate in 750 parts of water. 12 parts by volume of 10N-sodium hydroxide solution and 120 parts by volume of a sodium chromesalicylate solution (containing 2.8 parts of chromium in 100 parts by volume) are added, and the mixture is refluxed for 3 hours. After cooling, the solution of the 1:2-chromium complex so formed is neutralized with hydrochloric acid.

The above solution is cooled to 0° to 5°C and 40 parts of anhydrous sodium acetate are added. While stirring vigorously, 40 parts of α:β-dichloropropionyl chloride are added dropwise at 0° to 5°C within 40 minutes. After 2 hours the solution is neutralized with sodium carbonate, and the dyestuff is salted out with sodium chloride and filtered off.

The dyestuff dyes cotton reddish grey tints.

The parent dyestuff of the above formula is obtainable, for example, by coupling diazotized 5-nitro-2-aminophenol with 2-phenylamino-8-hydroxynaphthalene-3:6-disulfonic acid and reducing the nitro group in the resulting dyestuff to an amino group by means of sodium hydrosulfide.

the above solution which is then cooled to 0° to 5°C, and at that temperature, while stirring vigorously, a solution of 35 parts of α:β-dichloropropionyl chloride is added dropwise. After 1 hour the solution is neutralized and the dyestuff is obtained by evaporating the solution in vacuo.

The dyestuff dyes cotton covered violet tints.

By acylating the metalliferous azo dyestuffs listed in Column I with α:β-dichloropropionyl chloride or equivalent amounts of α:β-dibromopropionyl chloride as described in Examples 4 and 5 there are obtained dyestuffs that dye cotton the tints shown in Column II.

| I | II |
|---|---|
| 1. Copper complex of the dyestuff of the formula 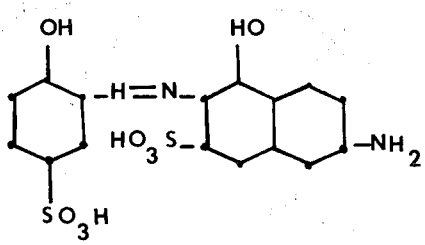 | ruby red |
| 2. 1:2-chromium complex of the dyestuff of the formula 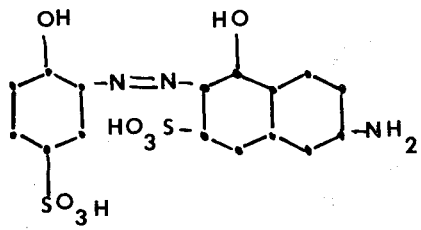 | bluish violet |
| 3. 1:2-chromium complex of the dyestuff 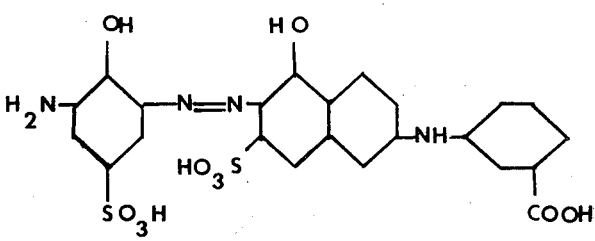 | reddish blue |

EXAMPLE 5

43.9 parts of the dyestuff of the formula

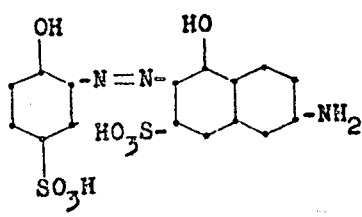

are neutralized with sodium carbonate in 500 parts of water. 12 parts by volume of 10N-sodium hydroxide solution and 310 parts by volume of a cobalt sulfate solution of 5% strength are added, and the mixture is heated for ½ hour at 75 to 80°C. The solution of the 1:2-cobalt complex obtained in this manner is allowed to cool and then adjusted to pH=7.

35 parts of anhydrous sodium acetate are added to

EXAMPLE 6

31.4 parts of 4-(α:β-dichloropropionylamino)-1-aminobenzene-2-sulfonic acid are dissolved in 600 parts of water with the addition of sodium carbonate. 30 parts of hydrochloric acid of 30% strength are added at 0° to 5°C, and the mixture is diazotized with 25 parts by volume of 4N-sodium nitrite solution. The diazo suspension, which gives an acid reaction to Congo, is then added to an ice-cold solution of 42.3 parts of 1-benzoylamino-8-hydroxynaphthalene-3:6-disulfonic acid and 30 parts of sodium carbonate in 400 parts of water. On completion of the coupling the dyestuff is salted out with sodium chloride, filtered off and dried in vacuo at 60° to 70°C.

The resulting dyestuff of the formula

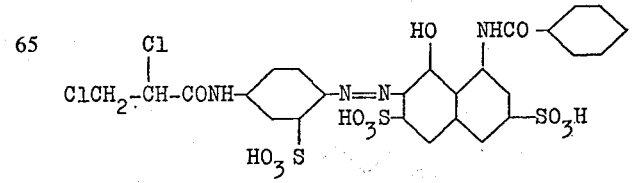

dyes cellulose by the process described in Example 11 red-violet tints.

If desired, the coupling can be carried out with advantage in the presence of sodium acetate or sodium bicarbonate.

The 4-(α:β-dichloropropionylamino)-1-aminobenzene-2-sulfonic acid used in this Example can be prepared thus:

18.8 parts of 1:4-diaminobenzene-2-sulfonic acid are dissolved in 400 parts of water, and then neutralized with sodium carbonate. While stirring vigorously, 21 parts of α:β-dichloropropionyl chloride are added dropwise at 0° to 5° in the course of 20 minutes, and at the same time the reaction solution is neutralized with dilute sodium carbonate solution so as to maintain the reaction solution at a pH value of 6 to 7. On completion of the reaction, the whole is acidified with hydrochloric acid, filtered, and the reaction product washed with saturated sodium chloride solution.

In a similar manner 5-(α:β-dichloropropionylamino)-1-aminobenzene-2-sulfonic acid can be prepared from 5-amino-1-aminobenzene-2-sulfonic acid.

In the following Table further dyestuffs are listed which are obtained according to the process described in Example 6 by coupling the diazotized amines listed in column 1 with the coupling components listed in column 2 and which yield on cotton dyeings having the shades indicated in column 4. In this Table the underlined amino-group means either an α:β-dichloropropionylamino group (I in column 3) or an α,β-dibromopropionylamino group (II in column 3). The diazo components corresponding to the indicated capital letters are the following:

A: aniline
B: 1-aminobenzene-2-sulfonic acid
C: 1,3-diaminobenzene-6-sulfonic acid
D: 1,4-diaminobenzene-6-sulfonic acid
E: 1-amino-4-methylbenzene-6-sulfonic acid
F: 1-amino-4-methoxybenzene-6-sulfonic acid
G: 1-amino-4-chlorobenzene-6-sulfonic acid
H: 1-amino-4-bromobenzene-6-sulfonic acid
J: 1,3-diamino-4-chlorobenzene-6-sulfonic acid
K: 1,3-diamino-4-methoxybenzene-6-sulfonic acid
L: 1,3-diamino-4-methylbenzene-6-sulfonic acid
M: 1-amino-4-phenoxybenzene-6-sulfonic acid
N: 1,4-diaminobenzene-2,5-disulfonic acid
O: 1,4-diaminobenzene-2,6-disulfonic acid
P: 1,3-diaminobenzene-4,6-disulfonic acid
Q: 1-aminobenzene-2,5-disulfonic acid
R: 1-aminobenzene-2,4-disulfonic acid
S: 2-aminonaphthalene-4,8-disulfonic acid
T: 1-aminonaphthalene-3,6-disulfonic acid
U: 2-aminonaphthalene-5,7-disulfonic acid
V: 2-aminonaphthalene-6,8-disulfonic acid
X: 2-aminonaphthalene-4,6,8-trisulfonic acid
Y: 2-aminonaphthalene-1-sulfonic acid.

| | I | II | III | IV |
|---|---|---|---|---|
| 1) | A | 1-amino-8-hydroxynaphthalene-3,6-disulfonic acid | I | red |
| 2) | A | " | II | " |
| 3) | B | " | I | " |
| 4) | B | " | II | " |
| 5) | C | " | I | " |
| 6) | D | " | I | bluish-red |
| 7) | E | " | I | red |
| 8) | E | " | II | " |
| 9) | F | " | I | " |
| 10) | F | " | II | " |
| 11) | G | " | I | " |
| 12) | G | " | II | " |
| 13) | H | " | I | " |
| 14) | H | " | II | " |
| 15) | J | " | I | " |
| 16) | K | " | I | " |
| 17) | L | " | I | " |
| 18) | M | " | I | " |
| 19) | M | " | II | " |
| 20) | A | 1-amino-8-hydroxynaphthalene-4,6-disulfonic acid | I | " |
| 21) | A | " | II | " |
| 22) | B | " | I | " |
| 23) | B | " | II | " |
| 24) | C | " | I | " |
| 25) | D | " | I | bluish-red |
| 26) | E | " | I | red |
| 27) | E | " | II | " |
| 28) | F | " | I | " |
| 29) | F | " | II | " |
| 30) | G | " | I | " |
| 31) | G | " | II | " |
| 32) | H | " | I | " |
| 33) | H | " | II | " |
| 34) | J | " | I | " |
| 35) | K | " | I | " |
| 36) | L | " | I | " |
| 37) | M | " | I | " |
| 38) | M | " | II | " |
| 39) | C | 1-acetylamino-8-hydroxynaphthalene-3,6-disulfonic acid | I | " |
| 40) | D | " | I | bluish-red |
| 41) | J | " | I | red |
| 42) | K | " | I | " |
| 43) | L | " | I | " |
| 44) | C | 1-N-benzoylamino-8-hydroxynaphthalene-3,6-disulfonic acid | I | bluish-red |
| 45) | J | " | I | " |
| 46) | K | " | I | " |
| 43) | L | " | I | " |
| 44) | C | 1-N-acetylamino-8-hydroxynaphthalene-4,6-disulfonic acid | I | red |
| 45) | D | " | I | bluish-red |
| 46) | J | " | I | red |
| 47) | K | " | I | " |
| 48) | L | " | I | " |
| 49) | C | 1-N-butyrylamino-8-hydroxynaphthalene-4,6-disulfonic acid | I | " |
| 50) | D | " | I | " |
| 51) | J | " | I | " |
| 52) | K | " | I | " |
| 53) | L | " | I | " |
| 54) | C | 1-N-benzoylamino-8-hydroxynaphthalene-4,6-disulfonic acid | I | " |
| 55) | D | " | I | " |
| 56) | J | " | I | bluish-red |
| 57) | K | " | I | " |
| 58) | L | " | I | " |
| 59) | C | 2-ureido-5-hydroxynaphthalene-7-sulfonic acid | I | orange |
| 60) | C | " | II | " |
| 61) | D | " | II | reddish-orange |

By coupling the diazotised amines listed in column 1 with the coupling components listed in column 2 of the following Table further dyestuffs are obtained, which yield on cotton dyeings having the shades indicated in column 3. In this Table the underlined amino-group always means either an α,β-dichloropropionylamino- or an α,β-dibromopropionylamino group:

| | I | II | III |
|---|---|---|---|
| 1) | J | 2-ureido-5-hydroxynaphthalene-7-sulfonic acid | orange |
| 2) | K | " | " |
| 3) | L | " | " |
| 4) | C | 2-(N-α,β-dichloropropionyl-N-methyl)-amino-5-hydroxynaphthalene-7-sulfonic acid | " |
| 5) | D | " | reddish-orange |
| 6) | J | " | orange |
| 7) | K | " | " |
| 8) | L | " | " |

-continued

| | I | II | III |
|---|---|---|---|
| 9) | C | 2-N-α,β-dibromopropionylmethylamino-5-hydroxy-naphthalene-7-sulfonic acid | '' |
| 10) | D | '' | reddish-orange |
| 11) | J | '' | orange |
| 12) | K | '' | '' |
| 13) | L | '' | '' |
| 14) | B | 2-amino-5-hydroxynaphthalene-7-sulfonic acid | '' |
| 15) | E | '' | reddish-orange |
| 16) | F | '' | '' |
| 17) | G | '' | '' |
| 18) | H | '' | '' |
| 19) | M | '' | '' |
| 20) | C | 2-N-α,β-Dichloropropionylamino-5-hydroxy-naphthalene-7-sulfonic acid | orange |
| 21) | D | '' | reddish-orange |
| 22) | J | '' | '' |
| 23) | K | '' | '' |
| 24) | L | '' | '' |
| 25) | C | 2-N-α,β-dibromopropionylamino-5-hydroxy-naphthalene-7-sulfonic acid | orange |
| 26) | D | '' | reddish-orange |
| 27) | J | '' | '' |
| 28) | K | '' | '' |
| 29) | L | '' | '' |
| 30) | B | 2-amino-8-hydroxynaphthalene-6-sulfonic acid | orange |
| 31) | E | '' | reddish-orange |
| 32) | F | '' | '' |
| 33) | G | '' | '' |
| 34) | H | '' | '' |
| 35) | B | 2-N-methylamino-8-hydroxynaphthalene-6-sulfonic acid | orange-red |
| 36) | E | '' | red |
| 37) | F | '' | '' |
| 38) | G | '' | '' |
| 39) | H | '' | '' |
| 40) | M | '' | '' |
| 41) | C | 2-α,β-dichloropropionylamino-8-hydroxynaphthalene-6-sulfonic acid | orange |
| 42) | D | '' | red |
| 43) | J | '' | scarlet |
| 44) | K | '' | '' |
| 45) | L | '' | '' |
| 46) | C | 2-N-α,β-dibrompropionylamino-8-hydroxynaphthalene-6-sulfonic acid | reddish-orange |
| 47) | D | '' | red |
| 48) | J | '' | scarlet |
| 49) | K | '' | '' |
| 50) | L | '' | '' |
| 51) | C | 2-(N-α,β-dichloropropionyl-N-methylamino)-8-hydroxy-naphthalene-6-sulfonic acid | reddish-orange |
| 52) | D | '' | red |
| 53) | J | '' | scarlet |
| 54) | K | '' | '' |
| 55) | L | '' | '' |
| 56) | C | 2-(N-α,β-dibrompropionyl-N-methylamino)-8-hydroxy-naphthalene-6-sulfonic acid | reddish-orange |
| 57) | D | '' | red |
| 58) | J | '' | scarlet |
| 59) | K | '' | '' |
| 60) | L | '' | '' |
| 61) | O | 1-hydroxynaphthalin | yellow |
| 62) | O | 2-hydroxynaphthalin | '' |
| 63) | O | 1-hydroxynaphthalin-4-sulfonic acid | '' |
| 64) | O | 1-hydroxynaphthalin-5-sulfonic acid | '' |
| 65) | O | 2-hydroxynaphthalin-4-sulfonic acid | '' |
| 66) | O | 2-hydroxynaphthalene-6-sulfonic acid | '' |
| 67) | O | 2-hydroxynaphthalene-7-sulfonic acid | '' |
| 68) | O | 3-methyl-5-pyrazolone | '' |
| 69) | O | 1-phenyl-3-methyl-5-pyrazolone | '' |
| 70) | O | 1-(3'-α,β-dibrompropionylaminophenyl)-3-methyl-5-pyrazolone | '' |
| 71) | O | 1-(4'-α,β-dibrompropionylaminophenyl)-3-methyl-5-pyrazolone | '' |
| 72) | O | 1-phenyl-3-carboxy-5-pyrazolone | '' |
| 73) | O | 3-carboxy-5-pyrazolone | yellow |
| 74) | C | 2-aminonaphthalene-5-sulfonic acid | orange |
| 75) | C | 2-aminonaphthalene-6-sulfonic acid | '' |
| 76) | C | 2-aminonaphthalene-7-sulfonic acid | '' |
| 77) | C | 2-aminonaphthalene-8-sulfonic acid | '' |
| 78) | C | 1-aminonaphthalene-4-sulfonic acid | red |
| 79) | C | 1-aminonaphthalene-5-sulfonic acid | '' |
| 80) | C | 1-aminonaphthalene-6-sulfonic acid | '' |
| 81) | C | 1-aminonaphthalene-7-sulfonic acid | '' |
| 82) | C | 1-aminonaphthalene-8-sulfonic acid | '' |
| 83) | D | 2-aminonaphthalene-5-sulfonic acid | orange |
| 84) | D | 2-aminonaphthalene-6-sulfonic acid | '' |
| 85) | D | 2-aminonaphthalene-7-sulfonic acid | '' |
| 86) | D | 2-aminonaphthalene-8-sulfonic acid | '' |
| 87) | D | 1-aminonaphthalene-4-sulfonic acid | red |
| 88) | D | 1-aminonaphthalene-5-sulfonic acid | '' |
| 89) | D | 1-aminonaphthalene-6-sulfonic acid | '' |
| 90) | D | 1-aminonaphthalene-7-sulfonic acid | '' |
| 91) | D | 1-aminonaphthalene-8-sulfonic acid | '' |
| 92) | G | 2-aminonaphthalene-5-sulfonic acid | orange |
| 93) | G | 2-aminonaphthalene-6-sulfonic acid | '' |

3,923,778

-continued

| | I | II | III |
|---|---|---|---|
| 94) | G | 2-aminonaphthalene-7-sulfonic acid | " |
| 95) | G | 2-aminonaphthalene-8-sulfonic acid | " |
| 96) | G | 1-aminonaphthalene-4-sulfonic acid | red |
| 97) | G | 1-aminonaphthalene-5-sulfonic acid | " |
| 98) | G | 1-aminonaphthalene-6-sulfonic acid | " |
| 99) | G | 1-aminonaphthalene-7-sulfonic acid | " |
| 100) | G | 1-aminonaphthalene-8-sulfonic acid | " |
| 101) | K | 2-aminonaphthalene-5-sulfonic acid | orange |
| 102) | K | 2-aminonaphthalene-6-sulfonic acid | " |
| 103) | K | 2-aminonaphthalene-7-sulfonic acid | " |
| 104) | K | 2-aminonaphthalene-8-sulfonic acid | " |
| 105) | K | 1-aminonaphthalene-4-sulfonic acid | red |
| 106) | K | 1-aminonaphthalene-5-sulfonic acid | " |
| 107) | K | 1-aminonaphthalene-6-sulfonic acid | " |
| 108) | K | 1-aminonaphthalene-7-sulfonic acid | " |
| 109) | K | 1-aminonaphthalene-8-sulfonic acid | " |
| 110) | K | 2-aminonaphthalene-5-sulfonic acid | orange |
| 111) | K | 2-aminonaphthalene-6-sulfonic acid | " |
| 112) | K | 2-aminonaphthalene-7-sulfonic acid | " |
| 113) | K | 2-aminonaphthalene-8-sulfonic acid | " |
| 114) | K | 1-aminonaphthalene-4-sulfonic acid | red |
| 115) | K | 1-aminonaphthalene-5-sulfonic acid | " |
| 116) | K | 1-aminonaphthalene-6-sulfonic acid | " |
| 117) | K | 1-aminonaphthalene-7-sulfonic acid | " |
| 118) | K | 1-aminonaphthalene-8-sulfonic acid | " |
| 119) | L | 2-aminonaphthalene-5-sulfonic acid | orange |
| 120) | L | 2-aminonaphthalene-6-sulfonic acid | " |
| 121) | L | 2-aminonaphthalene-7-sulfonic acid | " |
| 122) | L | 2-aminonaphthalene-8-sulfonic acid | " |
| 123) | L | 1-aminonaphthalene-4-sulfonic acid | red |
| 124) | L | 1-aminonaphthalene-5-sulfonic acid | " |
| 125) | L | 1-aminonaphthalene-6-sulfonic acid | " |
| 126) | L | 1-aminonaphthalene-7-sulfonic acid | " |
| 127) | L | 1-aminonaphthalene-8-sulfonic acid | " |
| 128) | N | 2-aminonaphthalene-5-sulfonic acid | orange |
| 129) | N | 2-aminonaphthalene-6-sulfonic acid | " |
| 130) | N | 2-aminonaphthalene-7-sulfonic acid | " |
| 131) | N | 2-aminonaphthalene-8-sulfonic acid | " |
| 132) | N | 1-aminonaphthalene-4-sulfonic acid | red |
| 133) | N | 1-aminonaphthalene-5-sulfonic acid | " |
| 134) | N | 1-aminonaphthalene-6-sulfonic acid | " |
| 135) | N | 1-aminonaphthalene-7-sulfonic acid | " |
| 136) | N | 1-aminonaphthalene-8-sulfonic acid | " |
| 137) | O | 2-aminonaphthalene-5-sulfonic acid | orange |
| 138) | O | 2-aminonaphthalene-6-sulfonic acid | " |
| 139) | O | 2-aminonaphthalene-7-sulfonic acid | " |
| 140) | O | 2-aminonaphthalene-8-sulfonic acid | " |
| 141) | O | 1-aminonaphthalene-4-sulfonic acid | " |
| 142) | O | 1-aminonaphthalene-5-sulfonic acid | " |
| 143) | O | 1-aminonaphthalene-6-sulfonic acid | " |
| 144) | O | 1-aminonaphthalene-7-sulfonic acid | " |
| 145) | O | 1-aminonaphthalene-8-sulfonic acid | " |
| 146) | P | 2-aminonaphthalene-5-sulfonic acid | " |
| 147) | P | 2-aminonaphthalene-6-sulfonic acid | " |
| 148) | P | 2-aminonaphthalene-7-sulfonic acid | " |
| 149) | P | 2-aminonaphthalene-8-sulfonic acid | " |
| 150) | P | 1-aminonaphthalene-4-sulfonic acid | red |
| 151) | P | 1-aminonaphthalene-5-sulfonic acid | " |
| 152) | P | 1-aminonaphthalene-6-sulfonic acid | " |
| 153) | P | 1-aminonaphthalene-7-sulfonic acid | " |
| 154) | P | 1-aminonaphthalene-8-sulfonic acid | " |
| 155) | C | 1-hydroxynaphthalene-4-sulfonic acid | " |
| 156) | C | 1-hydroxynaphthalene-5-sulfonic acid | " |
| 157) | C | 2-hydroxynaphthalene-6-sulfonic acid | orange |
| 158) | C | 2-hydroxynaphthalene-7-sulfonic acid | " |
| 159) | C | 2-hydroxynaphthalene-8-sulfonic acid | " |
| 160) | D | 1-hydroxynaphthalene-4-sulfonic acid | " |
| 161) | D | 1-hydroxynaphthalene-5-sulfonic acid | " |
| 162) | D | 2-hydroxynaphthalene-6-sulfonic acid | " |
| 163) | D | 2-hydroxynaphthalene-7-sulfonic acid | " |
| 164) | D | 2-hydroxynaphthalene-8-sulfonic acid | " |
| 165) | G | 1-hydroxynaphthalene-4-sulfonic acid | red |
| 166) | G | 1-hydroxynaphthalene-5-sulfonic acid | " |
| 167) | G | 2-hydroxynaphthalene-6-sulfonic acid | orange |
| 168) | G | 2-hydroxynaphthalene-7-sulfonic acid | " |
| 169) | G | 2-hydroxynaphthalene-8-sulfonic acid | " |
| 170) | K | 1-hydroxynaphthalene-4-sulfonic acid | red |
| 171) | K | 1-hydroxynaphthalene-5-sulfonic acid | " |
| 172) | K | 2-hydroxynaphthalene-6-sulfonic acid | orange |
| 173) | K | 2-hydroxynaphthalene-7-sulfonic acid | " |
| 174) | K | 2-hydroxynaphthalene-8-sulfonic acid | " |
| 175) | K | 1-hydroxynaphthalene-4-sulfonic acid | red |
| 176) | K | 1-hydroxynaphthalene-5-sulfonic acid | " |
| 177) | K | 1-hydroxynaphthalene-6-sulfonic acid | orange |
| 178) | K | 2-hydroxynaphthalene-7-sulfonic acid | " |
| 179) | K | 2-hydroxynaphthalene-8-sulfonic acid | " |
| 180) | L | 1-hydroxynaphthalene-4-sulfonic acid | red |
| 181) | L | 1-hydroxynaphthalene-5-sulfonic acid | " |
| 182) | L | 2-hydroxynaphthalene-6-sulfonic acid | orange |
| 183) | L | 2-hydroxynaphthalene-7-sulfonic acid | " |
| 184) | L | 2-hydroxynaphthalene-8-sulfonic acid | " |
| 185) | N | 1-hydroxynaphthalene-4-sulfonic acid | red |
| 186) | N | 1-hydroxynaphthalene-5-sulfonic acid | " |
| 187) | N | 2-hydroxynaphthalene-6-sulfonic acid | orange |
| 188) | N | 2-hydroxynaphthalene-7-sulfonic acid | " |

-continued

| | I | II | III |
|---|---|---|---|
| 189) | N | 2-hydroxynaphthalene-8-sulfonic acid | ,, |
| 190) | O | 1-hydroxynaphthalene-4-sulfonic acid | red |
| 191) | O | 1-hydroxynaphthalene-5-sulfonic acid | ,, |
| 192) | O | 2-hydroxynaphthalene-6-sulfonic acid | orange |
| 193) | O | 2-hydroxynaphthalene-7-sulfonic acid | ,, |
| 194) | O | 2-hydroxynaphthalene-8-sulfonic acid | ,, |
| 195) | P | 1-hydroxynaphthalene-4-sulfonic acid | red |
| 196) | P | 1-hydroxynaphthalene-5-sulfonic acid | ,, |
| 197) | P | 2-hydroxynaphthalene-6-sulfonic acid | ,, |
| 198) | P | 2-hydroxynaphthalene-7-sulfonic acid | orange |
| 199) | P | 2-hydroxynaphthalene-8-sulfonic acid | ,, |
| 200) | C | 1-hydroxynaphthalene-3,6-disulfonic acid | red |
| 201) | C | 1-hydroxynaphthalene-4,8-disulfonic acid | ,, |
| 202) | C | 2-hydroxynaphthalene-3,6-disulfonic acid | orange |
| 203) | C | 2-hydroxynaphthalene-5,7-disulfonic acid | ,, |
| 204) | C | 2-hydroxynaphthalene-6,8-disulfonic acid | ,, |
| 205) | D | 1-hydroxynaphthalene-3,6-disulfonic acid | red |
| 206) | D | 1-hydroxynaphthalene-4,8-disulfonic acid | ,, |
| 207) | D | 2-hydroxynaphthalene-3,6-disulfonic acid | orange |
| 208) | D | 2-hydroxynaphthalene-5,7-disulfonic acid | ,, |
| 209) | D | 2-hydroxynaphthalene-6,8-disulfonic acid | ,, |
| 210) | G | 1-hydroxynaphthalene-3,6-disulfonic acid | red |
| 211) | G | 1-hydroxynaphthalene-4,8-disulfonic acid | ,, |
| 212) | G | 2-hydroxynaphthalene-3,6-disulfonic acid | orange |
| 213) | G | 2-hydroxynaphthalene-5,7-disulfonic acid | ,, |
| 214) | G | 2-hydroxynaphthalene-6,8-disulfonic acid | ,, |
| 215) | K | 1-hydroxynaphthalene-3,6-disulfonic acid | red |
| 216) | K | 1-hydroxynaphthalene-4,8-disulfonic acid | ,, |
| 217) | K | 2-hydroxynaphthalene-3,6-disulfonic acid | orange |
| 218) | K | 2-hydroxynaphthalene-5,7-disulfonic acid | ,, |
| 219) | K | 2-hydroxynaphthalene-6,8-disulfonic acid | ,, |
| 220) | L | 1-hydroxynaphthalene-3,6-disulfonic acid | red |
| 221) | L | 1-hydroxynaphthalene-4,8-disulfonic acid | ,, |
| 222) | L | 2-hydroxynaphthalene-3,6-disulfonic acid | orange |
| 223) | L | 2-hydroxynaphthalene-5,7-disulfonic acid | ,, |
| 224) | L | 2-hydroxynaphthalene-6,8-disulfonic acid | ,, |
| 225) | C | 2-N-methylaminonaphthalene-6-sulfonic acid | orange-red |
| 226) | D | ,, | bluish-red |
| 227) | J | ,, | red |
| 228) | K | ,, | ,, |
| 229) | L | ,, | ,, |
| 230) | N | ,, | ,, |
| 231) | O | ,, | orange |
| 232) | P | 2-N-methylaminonaphthalene-6-sulfonic acid | ,, |
| 233) | C | 2-N-methylaminonaphthalene-7-sulfonic acid | orange-red |
| 234) | D | ,, | bluish-red |
| 235) | Q | 1-aminobenzene | yellow |
| 236) | Q | 1-amino-3-β-chlorpropionylaminobenzene | ,, |
| 237) | Q | 1-amino-3-acetylaminobenzene | ,, |
| 238) | Q | 1-amino-3-methylbenzene | ,, |
| 239) | Q | 1-amino-3-methoxybenzene | ,, |
| 240) | Q | 1-amino-2-methoxybenzene | ,, |
| 241) | Q | 1-amino-2-methoxy-5-methylbenzene | ,, |
| 242) | Q | 3-aminophenylurea | reddish yellow |
| 243) | S | 1-aminobenzene | ,, |
| 244) | S | 1-amino-3-β-chlorpropionylaminobenzene | ,, |
| 245) | S | 1-amino-3-acetylaminobenzene | ,, |
| 246) | S | 1-amino-3-methylbenzene | ,, |
| 247) | S | 1-amino-3-methoxybenzene | ,, |
| 248) | S | 1-amino-2-methoxybenzene | ,, |
| 249) | S | 1-amino-2-methoxy-5-methylbenzene | ,, |
| 250) | S | 3-aminophenylurea | yellow |
| 251) | T | 1-aminobenzene | ,, |
| 252) | T | 1-amino-3-β-chloropropionylaminobenzene | ,, |
| 253) | T | 1-amino-3-acetylaminobenzene | ,, |
| 254) | T | 1-amino-3-methylbenzene | ,, |
| 255) | T | 1-amino-3-methoxybenzene | ,, |
| 256) | T | 1-amino-2-methoxybenzene | ,, |
| 257) | T | 1-amino-2-methoxy-5-methylbenzene | ,, |
| 258) | T | 3-aminophenylurea | yellowish orange |
| 259) | U | 1-aminobenzene | ,, |
| 260) | U | 1-amino-3-β-chlorpropionylaminobenzene | ,, |
| 261) | U | 1-amino-3-acetylaminobenzene | ,, |
| 262) | U | 1-amino-3-methylbenzene | ,, |
| 263) | U | 1-amino-3-methoxybenzene | ,, |
| 264) | U | 1-amino-2-methoxybenzene | ,, |
| 265) | U | 1-amino-2-methoxy-5-methylbenzene | ,, |
| 266) | U | 3-aminophenylurea | ,, |
| 267) | V | 1-aminobenzene | ,, |
| 268) | V | 1-amino-3-β-chlorpropionylaminobenzene | ,, |
| 269) | V | 1-amino-3-acetylaminobenzene | ,, |
| 270) | V | 1-amino-3-methylbenzene | ,, |
| 271) | V | 1-amino-3-methoxybenzene | ,, |
| 272) | V | 1-amino-2-methoxybenzene | ,, |
| 273) | V | 1-amino-2-methoxy-5-methylbenzene | ,, |
| 274) | V | 3-aminophenylurea | reddish-yellow |
| 275) | X | 1-aminobenzene | ,, |
| 276) | X | 1-amino-3-β-chlorpropionylaminobenzene | ,, |
| 277) | X | 1-amino-3-acetylaminobenzene | ,, |
| 278) | X | 1-amino-3-methylbenzene | ,, |
| 279) | X | 1-amino-3-methoxybenzene | ,, |

-continued

| | I | II | III |
|---|---|---|---|
| 280) | X | 1-amino-2-methoxybenzene | " |
| 281) | X | 1-amino-2-methoxy-5-methylbenzene | " |
| 282) | X | 3-aminophenylurea | " |
| 283) | C | 1(2',5'-dichloro-4'-sulfophenyl)-3-methyl-5-pyrazolone | yellow |
| 284) | J | " | " |
| 285) | L | " | " |
| 286) | N | " | " |
| 287) | O | " | " |
| 288) | P | " | " |
| 289) | C | 1(2',5'-disulfophenyl)-3-methyl-5-pyrazolone | " |
| 290) | J | " | " |
| 291) | L | " | " |
| 292) | C | 1-(3'-sulfophenyl)-3-methyl-5-pyrazolone | " |
| 293) | J | " | " |
| 294) | L | " | " |
| 295) | N | " | " |
| 296) | O | " | " |
| 297) | P | " | " |
| 298) | P | 1-(-4'-sulfophenyl)-3-methyl-5-pyrazolone | " |
| 299) | C | " | " |
| 300) | N | " | " |
| 301) | O | " | yellow |
| 302) | C | 1-(2'-chloro-5'-sulfophenyl)-3-methyl-5-pyrazolone | " |
| 303) | J | " | " |
| 304) | L | " | " |
| 305) | N | " | " |
| 306) | O | " | " |
| 307) | P | " | " |
| 308) | P | 1-(2'-chlorophenyl)-3-methyl-5-pyrazolone | " |
| 309) | O | " | " |
| 310) | N | " | " |
| 311) | N | 3-methyl-5-pyrazolone | " |
| 312) | O | 1-(2'-chloro-6'-methylphenyl)-3-methyl-5-pyrazolone | " |
| 313) | N | " | " |
| 314) | P | " | " |
| 315) | Q | 1-(3'-aminophenyl)-3-methyl-5-pyrazolone | " |
| 316) | N | 1-phenyl-3-carboxy-5-pyrazolone | " |
| 317) | P | 1-(2'-ethylphenyl)-3-methyl-5-pyrazolone | " |
| 318) | O | " | " |
| 319) | N | | |
| 320) | N | 1-(2'-methylphenyl)-3-methyl-5-pyrazolone | " |
| 321) | Q | 1-(4'-aminophenyl)-3-methyl-5-pyrazolone | " |
| 322) | C | 1-(4',8'-disulfonaphthyl)-3-methyl-5-pyrazolone | " |
| 323) | J | " | " |
| 324) | L | " | " |
| 325) | Y | 1-amino-8-hydroxynaphthalene-3,6-disulfonic acid | red |
| 326) | Y | 1-amino-8-hydroxynaphthalene-4,6-disulfonic acid | " |
| 327) | Y | 2-amino-8-hydroxynaphthalene-6-sulfonic acid | |
| 328) | Y | 2-amino-5-hydroxynaphthalene-7-sulfonic acid | orange |
| 329) | C | 1-N-butyrylamino-8-hydroxynaphthalene-3-sulfonic acid | red |
| 330) | C | 1-N-α,β-dibrompropionylamino-8-hydroxynaphthalene-3-sulfonic acid | " |
| 331) | C | 1-N-acetylamino-8-hydroxynaphthalene-6-sulfonic acid | " |
| 332) | C | 1-N-propionylamino-8-hydroxynaphthalene-3,6-disulfonic acid | " |
| 333) | C | 1-N-propionylamino-8-hydroxynaphthalene-4,6-disulfonic acid | " |
| 334) | C | 1-N-β-chloropropionylamino-8-hydroxynaphthalene-3,6-sulfonic acid | " |
| 335) | C | 1-N-β-chloropropionylamino-8-hydroxynaphthalene-4,6-disulfonic acid | " |
| 336) | N | 2-aminonaphthalene | " |
| 337) | N | 2-N-methylaminonaphthalene | " |
| 338) | P | " | " |
| 339) | P | 2-aminonaphthalene | " |
| 340) | | " | " |

EXAMPLE 7

4.78 parts of 2-amino-5-hydroxynaphthalene-7-sulfonic acid are neutralized with sodium carbonate in 300 parts of water. While stirring vigorously, a solution of 4 parts of α:β-dichloropropionyl chloride in 10 parts of toluene is run in at ° to 5°C., and the reaction mixture is maintained at a weakly acid reaction (pH 5 to 6) by simultaneously adding dropwise dilute sodium hydroxide solution. After a short time the amino group is completely acylated.

The solution of the resulting 2-(α:β-dichloropropionylamino)-5-hydroxynaphthalene-7-sulfonic acid is treated with 5 parts of sodium bicarbonate, and the diazo compound obtained from 3.46 parts of 1-aminobenzene-2-sulfonic acid is added. After completion of the coupling, the dyestuff of the formula

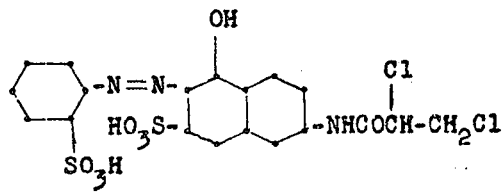

is completely precipitated with sodium chloride.

The dyestuff dyes cotton by the process described in Example 11 yellow-orange tints.

Dyestuffs that dye slightly more reddish tints are obtained when 1-aminobenzene-2-sulfonic acid is replaced by 1-aminobenzene-3-or -4-sulfonic acid.

Similar dyestuffs are obtained by using as the coupling component, instead of 2-(α:β-dichloropropionylamino)-5-hydroxynaphthalene-7-sulfonic acid, the 2-(α:β-dibromopropinoylamino-5-hydroxynaphthalene-7-sulfonic acid obtainable in analogous manner from 2-amino-5-hydroxynapththalene-7-sulfonic acid and α:β-dibromopropienyl chloride.

Further similar dyestuffs are obtained by using as coupling component 2-[N-methyl-N-(α:β-chloropropionyl)]amino-5-hydroxynaphthalene-7-sulfonic acid obtainable in an analogous manner from 2-N-methyl amino-5-hydroxynaphthalene-7-sulfonic acid and α:β-dichloropropionyl chloride.

When a diazo component shown in Column I is coupled with a coupling component of Column II by the process described in Example 6 or 7, dyestuffs are obtained that dye cotton the tints listed in Column III.

parts by volume of hydrochloric acid (specific gravity 1.15) are added, the whole is cooled to 0° to 5°C, and 250 parts by volume of 4N-sodium nitrite solution are run in. After 24 hours the nitrite reaction has almost completely disappeared. By adding acetone the diazotization can be accelerated.

226 parts of 2-amino-8-hydroxynaphthalene-6-sulfonic acid and 73 parts of sodium 1:3:6-naphthalenetrisulfonate are suspended in 2400 parts of water at 60° to 70°C and concentrated sodium hydroxide solution is added until the mixture is just acid to litmus. This solution is heated to 70° to 80°C and added slowly into the well-stirred diazo suspension. The temperature of 30° to 35°C, which is reached after the components have been mixed together, is maintained for 24 hours. A so-

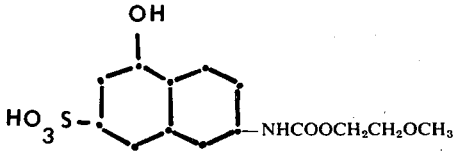

| | I | II | III |
|---|---|---|---|
| 1 | 4-(α:β-dichloropropionyl-amino)-1-aminobenzene-2-sulfonic acid | Barbituric acid | greenish yellow |
| 2 | " | acetoacetic acid-ortho-anisidide | " |
| 3 | " | 2-carbethoxyamino-5-hydroxynaphthalene-7-sulfonic acid | scarlet |
| 4 | " | | " |
| 5 | " | 1-acryloylamino-8-hydroxynaphthalene-3:6-disulfonic acid | bluish red |
| 6 | " | 1-(β-chloropropionyl-amino)-8-hydroxynaphthalene-3:6-disulfonic acid | " |
| 7 | " | 1-chloroacetylam/ino-8-hydroxynaphthalene-4:6-disulfonic acid | red |
| 8 | 1-aminobenzene-3-sulfonic acid | 1-(α:β-dichloropropionylamino)-8-hydroxynaphthalene-3:6-disulfonic acid | bluish red |
| 9 | 2-aminobenzoic acid | " | " |
| 10 | para-aminoacetanilide | " | violet |
| 11 | 4-chloroacetylamino-1-aminobenzene-2-sulfonic acid | " | violetish red |
| 12 | 5-acetylamino-1-aminobenzene-2-sulfonic acid | " | bluish red |
| 13 | " | 1-[3'-(α:β-dichloropropionylamino)-benzoylamino]-8-hydroxynaphthalene-3:6-disulfonic acid | |
| 14 | 4-acetylamino-1-aminobenzene-2-sulfonic acid | 2-(α:β-dichloropropionylamino)-5-hydroxynaphthalene-7-sulfonic acid | scarlet |
| 15 | 1-aminobenzene-3-sulfonic acid | 2-(α:β-dichloropropionylamino)-8-hydroxynaphthalene-6-sulfonic acid | yellowish red |
| 16 | 5-(α:β-dichloropropionylamino)-1-aminobenzene-2-sulfonic acid | 1-(2':4'-dichlorobenzoylamino)-8-hydroxynaphthalene-4:6-disulfonic acid | bluish red |
| 17 | 4-(α:β-dichloropropionylamino)-1-aminobenzene-2-sulfonic acid | N-ethyl-N-benzyl phenyl-amino-sulfonic acid | orange |

EXAMPLE 8

387 parts of 2-amino-5-(α:β-dichloropropionylamino)-4'-methyl-1:1'-diphenylsulfone are very finely pasted with 1800 parts of water on a roller mill. The paste is then diluted with 1200 parts of water, 250 lution of 140 parts of crystalline sodium acetate in 300 parts of warm water, rendered weakly acid to litmus with acetic acid, is added very slowly to the coupling mixture after completion of the addition of the 2-amino-8-hydroxynaphthalene-6-sulfonic acid. On completion of the coupling about 200 parts of calcined sodium carbonate are added to the dyestuff suspension at room temperature until it gives a slightly alkaline reaction to brilliant yellow paper, and the whole is then filtered. The resulting press cake is dried in vacuo at 50° to 60°C to yield a dark-red powder which is soluble in hot water.

2-amino-5-($\alpha$:$\beta$-dichloropropionylamino)-4'-methyl-1:1'-diphenylsulfone can be prepared, for example, thus:

298 parts of the hydrochloride of 2:5-diamino-4'-methyl-1:1'-diphenylsulfone are dissolved with heating in 1200 parts of water and 900 parts of glacial acetic acid and then cooled to 0°C. After adding 410 parts of crystalline sodium acetate, a solution of 268 parts of $\alpha$:$\beta$-dichloropropionyl chloride in 300 parts of toluene is stirred in within about 1 hour. The mixture is stirred for 30 minutes, and within 30 minutes 3200 parts of water are added dropwise; the whole is stirred on for another 30 minutes and then filtered. The residue is washed with a large amount of water at 30° to 40°C and then dried in vacuo at 60° to 70°C.

EXAMPLE 9

387 parts of 2-amino-5-($\alpha$:$\beta$-dichloropropionyl-amino)-4'-methyl-1:1'-diphenylsulfone are diazotized as described in Example 8, and the resulting diazo compound is coupled with 223 parts of 2aminonapthalene-6-sulfonic acid as described in Example 8. An orange red powder is obtained which is soluble in water.

EXAMPLE 10

40.3 parts of 5-($\alpha$:$\beta$-dibromoprionylamino)-1-aminobenzene-2-sulfonic acid are pasted in 800 parts of water, and 25 parts of hydrochloric acid of 30% strength are added. The whole is then diazotized at 0° to 5°C with 25 parts of 4N-sodium nitrite solution. The diazo suspension is then added to an ice-cold solution of 46.8 parts of the dyestuff of the formula

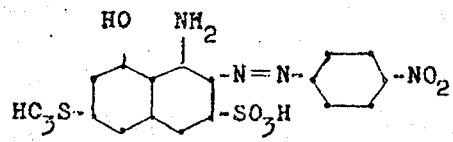

in 300 parts of 2N-sodium carbonate solution and 800 parts of water. On completion of the coupling the dyestuff is completely salted out with sodium chloride and dried in vacuo at 60° to 70°C. The dyestuff of the formula

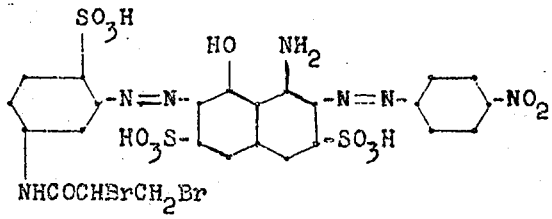

dyes cellulose greenish blue tints of very good wet fastness.

A dyestuff of very similar properties is obtained by using as the diazo compound the equivalent amount of 5-($\alpha$:$\beta$-dichloropropionylamino)-1-aminobenzene-2-sulfonic acid.

Further disazo dyestuffs of the general formula

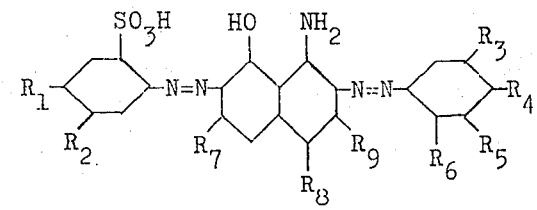

are obtained according to the process described in Example 10 and listed in the following Table. The radical R indicated in this Table means either an $\alpha$,$\beta$-dichloropropionylamino group or an $\alpha$,$\beta$-dibromopropionylamino group. All the dyestuffs yield on cottom dark greenish-blue to bluish black tints.

|    | $R_1$ | $R_2$ | $R_3$ | $R_4$ | $R_5$ | $R_6$ | $R_7$ | $R_8$ | $R_9$ |
|----|-------|-------|-------|-------|-------|-------|-------|-------|-------|
| 1  | RNH   | H     | $NO_2$ | H   | H     | H     | H     | $SO_3H$ | H   |
| 2  | ''    | ''    | H     | $NO_2$ | ''   | ''    | ''    | ''    | ''    |
| 3  | ''    | ''    | ''    | ''    | ''    | $SO_3H$ | ''  | ''    | ''    |
| 4  | ''    | ''    | ''    | ''    | ''    | $NO_2$ | ''   | ''    | ''    |
| 5  | H     | R—NH  | $NO_2$ | H    | ''    | H     | ''    | ''    | ''    |
| 6  | ''    | ''    | H     | $NO_2$ | ''   | ''    | ''    | ''    | ''    |
| 7  | ''    | ''    | ''    | ''    | ''    | $SO_3H$ | ''  | ''    | ''    |
| 8  | ''    | ''    | ''    | ''    | ''    | $NO_2$ | ''   | ''    | ''    |
| 9  | ''    | H     | RNH   | H     | ''    | $SO_3H$ | ''  | ''    | ''    |
| 10 | ''    | ''    | H     | RNH   | ''    | ''    | ''    | ''    | ''    |
| 11 | RNH   | ''    | ''    | ''    | ''    | ''    | ''    | ''    | ''    |
| 12 | ''    | ''    | RNH   | H     | ''    | ''    | ''    | ''    | ''    |
| 13 | H     | RNH   | ''    | ''    | ''    | ''    | ''    | ''    | ''    |
| 14 | ''    | ''    | H     | RNH   | ''    | ''    | ''    | ''    | ''    |
| 15 | Cl    | ''    | $NO_2$ | H    | ''    | H     | ''    | ''    | ''    |
| 16 | $OCH_3$ | ''  | H     | $NO_2$ | ''   | $SO_3H$ | ''  | ''    | ''    |
| 17 | ''    | ''    | ''    | ''    | Cl    | H     | ''    | ''    | ''    |
| 18 | $CH_3$ | RNH  | ''    | ''    | H     | $SO_3H$ | ''  | ''    | ''    |
| 19 | Br    | RNH   | H     | $NO_2$ | ''   | $NO_2$ | H    | $SO_3H$ | H   |
| 20 | RNH   | H     | $CF_3$ | H    | ''    | H     | ''    | ''    | ''    |
| 21 | H     | RNH   | $NO_2$ | Cl   | ''    | ''    | ''    | ''    | ''    |
| 22 | ''    | H     | RNH   | ''    | ''    | $SO_3H$ | ''  | ''    | ''    |
| 23 | ''    | RNH   | $SO_3H$ | RNH | ''    | ''    | ''    | ''    | ''    |
| 24 | RNH   | H     | ''    | ''    | ''    | ''    | ''    | ''    | ''    |
| 25 | H     | RNH   | RNH   | $SO_3H$ | ''  | ''    | ''    | ''    | ''    |
| 26 | RNH   | H     | ''    | ''    | ''    | ''    | ''    | ''    | ''    |
| 27 | H     | RNH   | $SO_3H$ | H   | ''    | ''    | ''    | ''    | ''    |
| 28 | RNH   | H     | $NO_2$ | ''   | ''    | H     | $SO_3H$ | $SO_3H$ | '' |

-continued

| | $R_1$ | $R_2$ | $R_3$ | $R_4$ | $R_5$ | $R_6$ | $R_7$ | $R_8$ | $R_9$ |
|---|---|---|---|---|---|---|---|---|---|
| 29 | " | " | H | $NO_2$ | " | " | " | " | " |
| 30 | " | " | " | " | " | $SO_3H$ | " | " | " |
| 31 | " | " | " | " | " | $NO_2$ | " | " | " |
| 32 | H | R—NH | $NO_2$ | H | " | H | " | " | " |
| 33 | " | " | H | $NO_2$ | " | " | " | " | " |
| 34 | " | " | " | " | " | $SO_3H$ | " | " | " |
| 35 | " | " | " | " | " | $NO_2$ | " | " | " |
| 36 | " | H | RNH | H | " | $SO_3H$ | " | " | " |
| 37 | H | H | H | RNH | H | $SO_3H$ | $SO_3H$ | $SO_3H$ | H |
| 38 | RNH | " | " | " | " | " | " | " | " |
| 39 | " | " | RNH | H | " | " | " | " | " |
| 40 | H | RNH | " | " | " | " | " | " | " |
| 41 | " | " | H | RNH | " | " | " | " | " |
| 42 | Cl | " | $NO_2$ | H | " | H | " | " | " |
| 43 | $OCH_3$ | " | H | $NO_2$ | " | $SO_3H$ | " | " | " |
| 44 | " | " | " | " | Cl | H | " | " | " |
| 45 | $CH_3$ | RNH | " | " | H | $SO_3H$ | " | " | " |
| 46 | Br | " | " | " | " | $NO_2$ | " | " | " |
| 47 | RNH | H | $CF_3$ | H | " | H | " | " | " |
| 48 | H | RNH | $NO_2$ | Cl | " | " | " | " | " |
| 49 | " | H | RNH | " | " | $SO_3H$ | " | " | " |
| 50 | RNH | " | $NO_2$ | H | " | H | " | H | $SO_3H$ |
| 51 | " | " | H | $NO_2$ | " | $SO_3H$ | " | " | " |
| 52 | " | " | " | " | " | $NO_2$ | " | " | " |
| 53 | H | R—NH | $NO_2$ | H | " | H | " | " | " |
| 54 | " | " | H | $NO_2$ | " | $SO_3H$ | " | " | " |
| 55 | H | R—NH | H | $NO_2$ | H | $NO_2$ | $SO_3H$ | H | $SO_3H$ |
| 56 | " | H | RNH | H | " | $SO_3H$ | " | " | " |
| 57 | " | " | H | RNH | " | " | " | " | " |
| 58 | RNH | " | " | " | " | " | " | " | " |
| 59 | " | " | RNH | H | " | " | " | " | " |
| 60 | H | RNH | " | " | " | " | " | " | " |
| 61 | " | " | H | RNH | " | " | " | " | " |
| 62 | Cl | " | $NO_2$ | H | " | H | " | " | " |
| 63 | $OCH_3$ | " | H | $NO_2$ | " | $SO_3H$ | " | " | " |
| 64 | " | " | " | " | Cl | H | " | " | " |
| 65 | $CH_3$ | RNH | " | " | H | $SO_3H$ | " | " | " |
| 66 | Br | " | " | " | " | $NO_2$ | " | " | " |
| 67 | RNH | H | $CF_3$ | H | " | H | " | " | " |
| 68 | H | RNH | $NO_2$ | Cl | " | " | " | " | " |
| 69 | " | H | RNH | " | " | $SO_3H$ | " | " | " |

EXAMPLE 11

2 parts of the dyestuff obtained as described in Example 2 are dissolved in 100 parts of water.

A cotton fabric is impregnated with the solution on a padder, and the excess liquor is squeezed off until the weight of the fabric shows an increase of 75%.

The impregnated fabric is dried and then at room temperature impregnated with a solution containing per liter 10 grams of sodium hydroxide and 300 grams of sodium chloride, squeezed to a weight increase of 75%, steamed for 60 seconds at 100° to 101°C, rinsed, treated in a sodium bicarbonate solution of 0.5% strength, rinsed, soaped for 15 minutes in a boiling solution of 0.3% strength of a nonionic detergent, rinsed and dried.

A bluish red dyeing results which is fixed fast to boiling. When a spun rayon fabric is so dyed instead of a cotton fabric, a similarly good result is achieved.

EXAMPLE 12

2 parts of the dyestuff obtained as described in Example 3 and 20 parts of urea are dissolved in 80 parts of water, and 2 parts of sodium carbonate are added. A cotton fabric is impregnated with this solution, squeezed to a weight increase of 75%, and dried in air. The fabric is then exposed for 1 hour to dry heat of 80° to 90°C in drying cabinet, then rinsed, soaped at the boil and dried. A red-violet dyeing is obtained which is fast to wetting.

EXAMPLE 13

2 parts of dyestuff No. 11 of the Table in Example 3 are dissolved in 100 parts of water.

The resulting stock solution is added to 2900 parts of water at 20°, 30 parts of trisodium phosphate and 60 parts of sodium chloride are added. 100 parts of cotton are immersed in this bath, the temperature is raised to 80°C within 45 minutes, another 60 parts of sodium chloride are added, and dyeing is carried on for 30 minutes at 90° to 95°C. The dyeing is then rinsed, aftertreated for 15 minutes in a boiling solution containing per liter of water 2 grams of sodium carbonate and 3 grams of soap, once more rinsed in cold water and dried.

The resulting dyeing displays very good fastness to washing and light.

EXAMPLE 14

2 parts of dyestuff No. 4 of the Table in Example 7 are mixed with 20 parts of urea, dissolved in 28 parts of water, and stirred into 40 parts of a sodium alginate thickening of 5% strength. Finally, 10 parts of sodium carbonate solution of 10% strength are added.

A cotton fabric is printed with the printing paste on a roller printing machine, dried, and the resulting print is steamed for 8 minutes at 100°C in saturated steam. The printed fabric is then thoroughly rinsed in cold and hot water and dried.

In this manner a scarlet print is obtained which is fixed fast to boiling.

EXAMPLE 15

2 parts of the dyestuff described in Example 2 are mixed with 4 parts of urea and dissolved in 100 parts of water with the addition of 2 parts of sodium carbonate. A cotton fabric is impregnated with this solution, squeezed to a weight increase of 75%, dried, steamed for 3 minutes at 100°C, rinsed, soaped at the boil in a solution containing per liter 3 parts of a non-ionic detergent, rinsed and dried. A bluish red dyeing is obtained which has very good fastness to light and washing.

EXAMPLE 16

2 parts of the dyestuff obtained as described in Example 2 are rapidly stirred into 100 parts of a stock thickener containing 45 parts of 5% sodium alginate thickener, 31 parts of water, 20 parts of urea and 2 parts of sodium hydrogen carbonate. A cotton fabric is printed with this printing paste on a roller printing machine and then passed through a solution containing per liter 25 ml of 40% sodium hydroxyde solution and 925 ml of waterglass.

The fabric is then squeezed to a weight increase of 75%, rolled up while still wet and the role kept for 1 hour at 30°C. The fabric is then rinsed with cold and hot water, soaped for 15 minutes at 100°C, thoroughly rinsed again and dried. A bluish red print is obtained which has a very good fastness to light and wet-treatment.

What is claimed is:

1. A disazo dyestuff of the formula

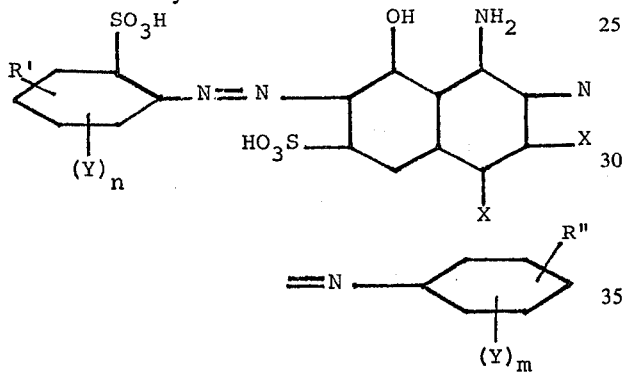

wherein R' represents hydrogen, lower alkyl, lower alkoxy, trifuloromethyl, chlorine or bromine,
One X is hydrogen and the other X is the sulphonic acid group,
R" is hydrogen, lower alkyl, lower alkoxy, trifluoromethyl, chlorine, bromine, sulfo or nitro,
Y is α:β-dichloropropionylamino or α:β-dibromopropionylamino,
n is 0 or 1
m is 0 or 1
the total of n + m being at least 1.

2. The disazo dyestuff as claimed in claim 1 of the formula

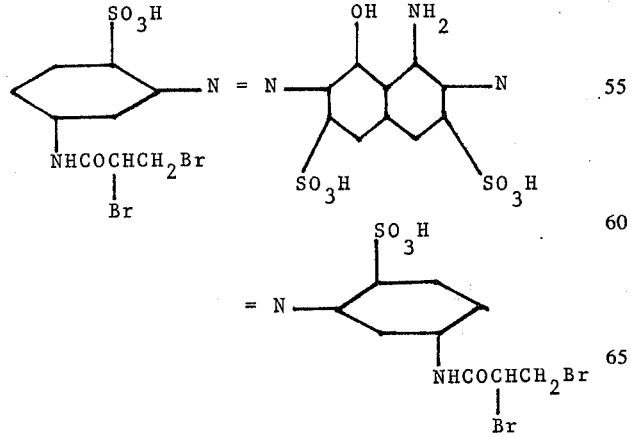

3. The disazo dyestuff as claimed in claim 1 of the formula

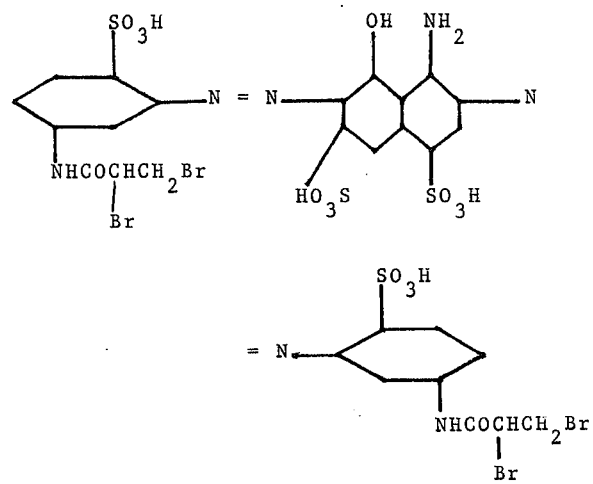

4. The disazo dyestuff of the formula

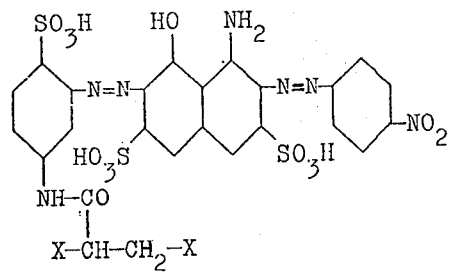

wherein each X is either chlorine or bromine.

5. The disazo dyestuff of the formula

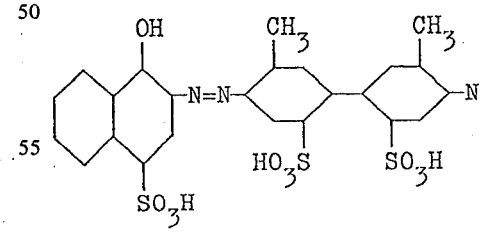

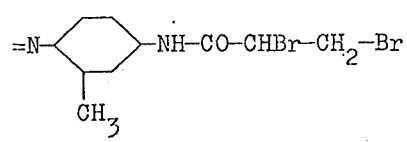

* * * * *